(12) United States Patent
Inoue et al.

(10) Patent No.: US 11,858,587 B2
(45) Date of Patent: Jan. 2, 2024

(54) BICYCLE PEDAL

(71) Applicant: Shimano Inc., Osaka (JP)

(72) Inventors: Akira Inoue, Osaka (JP); Tatsuya Watanabe, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 190 days.

(21) Appl. No.: 17/064,070

(22) Filed: Oct. 6, 2020

(65) Prior Publication Data

US 2022/0106009 A1 Apr. 7, 2022

(51) Int. Cl.
*B62M 3/08* (2006.01)

(52) U.S. Cl.
CPC ..................... *B62M 3/08* (2013.01)

(58) Field of Classification Search
CPC ........................................................ B62M 3/08
See application file for complete search history.

(56) References Cited

U.S. PATENT DOCUMENTS

| | | | | |
|---|---|---|---|---|
| 2,587,270 | A * | 2/1952 | Albers | B62M 3/08 D12/125 |
| 4,838,115 | A * | 6/1989 | Nagano | F16C 19/184 74/594.5 |
| 4,840,085 | A * | 6/1989 | Nagano | B62M 3/08 74/594.5 |
| 6,227,071 | B1 | 5/2001 | Coombe | |
| 9,003,921 | B2 | 4/2015 | Weagle | |
| 10,759,490 | B1 * | 9/2020 | Chen | F16C 23/04 |
| 2002/0100343 | A1 * | 8/2002 | Okajima | B62M 3/08 74/594.4 |
| 2004/0089098 | A1 * | 5/2004 | Plassiard | B62M 3/086 74/594.6 |
| 2004/0237709 | A1 * | 12/2004 | Chang | B62M 3/00 74/594.4 |

(Continued)

FOREIGN PATENT DOCUMENTS

| | | |
|---|---|---|
| CN | 2808718 Y | 8/2006 |
| CN | 201095410 Y | 8/2008 |

(Continued)

OTHER PUBLICATIONS

Define portion, Microsoft Bing, Jun. 8, 2022 (Year: 2022).*

(Continued)

*Primary Examiner* — Vinh Luong
(74) *Attorney, Agent, or Firm* — Global IP Counselors, LLP

(57) ABSTRACT

A bicycle pedal is provided with a pedal shaft and a pedal body. The pedal shaft has a first end portion configured to attach to a bicycle crank, a second end portion on an opposite side of the first end portion in an axial direction with respect to a rotational center axis of the pedal shaft, and a contact portion between the first end portion and the second end portion. The pedal body has a body part rotatably supported by the pedal shaft and a load receiving part at a position corresponding to the contact portion of the pedal shaft. The load receiving part receives a load from the contact portion of the pedal shaft. The load receiving part is at least partly spaced from the contact portion under a no load condition and contacts the contact portion upon a load applied to the pedal body from a rider.

34 Claims, 14 Drawing Sheets

(56) References Cited

U.S. PATENT DOCUMENTS

| | | | |
|---|---|---|---|
| 2004/0244170 A1 | 12/2004 | Lehner | |
| 2005/0138773 A1* | 6/2005 | Lehner | B25B 27/14 16/334 |
| 2009/0078081 A1* | 3/2009 | French | B62M 3/08 74/594.4 |
| 2009/0095122 A1* | 4/2009 | Weagle | B62M 3/08 74/560 |
| 2012/0137825 A1* | 6/2012 | Lin | B62M 3/08 74/594.4 |
| 2012/0291590 A1* | 11/2012 | Chamberlain | B62M 3/08 74/594.6 |
| 2014/0251077 A1* | 9/2014 | Chen | B62M 3/08 74/594.4 |
| 2014/0318309 A1* | 10/2014 | Hayes | B62M 3/08 74/594.4 |
| 2015/0090072 A1* | 4/2015 | Chen | B62M 3/08 74/594.4 |
| 2021/0316816 A1* | 10/2021 | Marinier | B62M 3/08 |

FOREIGN PATENT DOCUMENTS

| | | | | | |
|---|---|---|---|---|---|
| CN | 202152096 U | | 2/2012 | | |
| CN | 205707128 U | | 11/2016 | | |
| CN | 213502776 U | * | 6/2021 | ............. | B62M 3/08 |
| DE | 20 2009 014 025 U1 | | 2/2010 | | |
| DE | 102021124558 A1 | * | 4/2022 | ............. | B62M 3/08 |
| EP | 2 170 690 B1 | | 5/2013 | | |
| FR | 2661651 A | * | 11/1991 | ............. | B62M 3/08 |
| GB | 2536444 A | * | 9/2016 | ............. | B62M 3/08 |
| JP | 63-172795 U | | 11/1988 | | |
| JP | 63-176893 U | | 11/1988 | | |
| JP | 64-39192 U | | 3/1989 | | |
| JP | 2546149 Y2 | | 8/1997 | | |
| TW | M332062 U | | 5/2008 | | |
| TW | M339462 U | | 9/2008 | | |
| TW | M360204 U | | 7/2009 | | |
| TW | M376517 U | | 3/2010 | | |
| TW | M381585 U | | 6/2010 | | |
| TW | 202214482 A | * | 4/2022 | ............. | B62M 3/08 |
| WO | WO 2014034983 A1 | * | 3/2014 | ............. | B62M 3/08 |
| WO | WO 2016/013865 A1 | * | 1/2016 | ............. | B62M 3/08 |
| WO | WO 2016013865 A1 | * | 1/2016 | ............. | B62M 3/08 |

OTHER PUBLICATIONS

Define part, Microsoft Bing, Jun. 8, 2022 (Year: 2022).*
Load, Dictionary.com., Jun. 1, 2022 (Year: 2022).*
Force, Dictionary.com., Jun. 2, 2022 (Year: 2022).*
Distance, Dictionary.com., Jun. 9, 2022 (Year: 2022).*
Is resin a plastic material? Microsoft Bing, Jun. 3, 2022 (Year: 2022).*
Define support, Dictionary.com., Jun. 2, 2022 (Year: 2022).*
Machine translation of FR 2661651, Berenger, Nov. 8, 1991 (Year: 1991).*
Define groove, Microsoft Bing, Feb. 15, 2023 (Year: 2023).*
Machine translation of WO 2016/013865 A1, Lee, Jan. 28, 2016 (Year: 2016).*
Machine translation of WO 2014034983 A1, Jung et al., Mar. 6, 2014 (Year: 2014).*
Translation of CN 213502776 U, Xie, Jun. 22, 2021 (Year: 2021).*

* cited by examiner

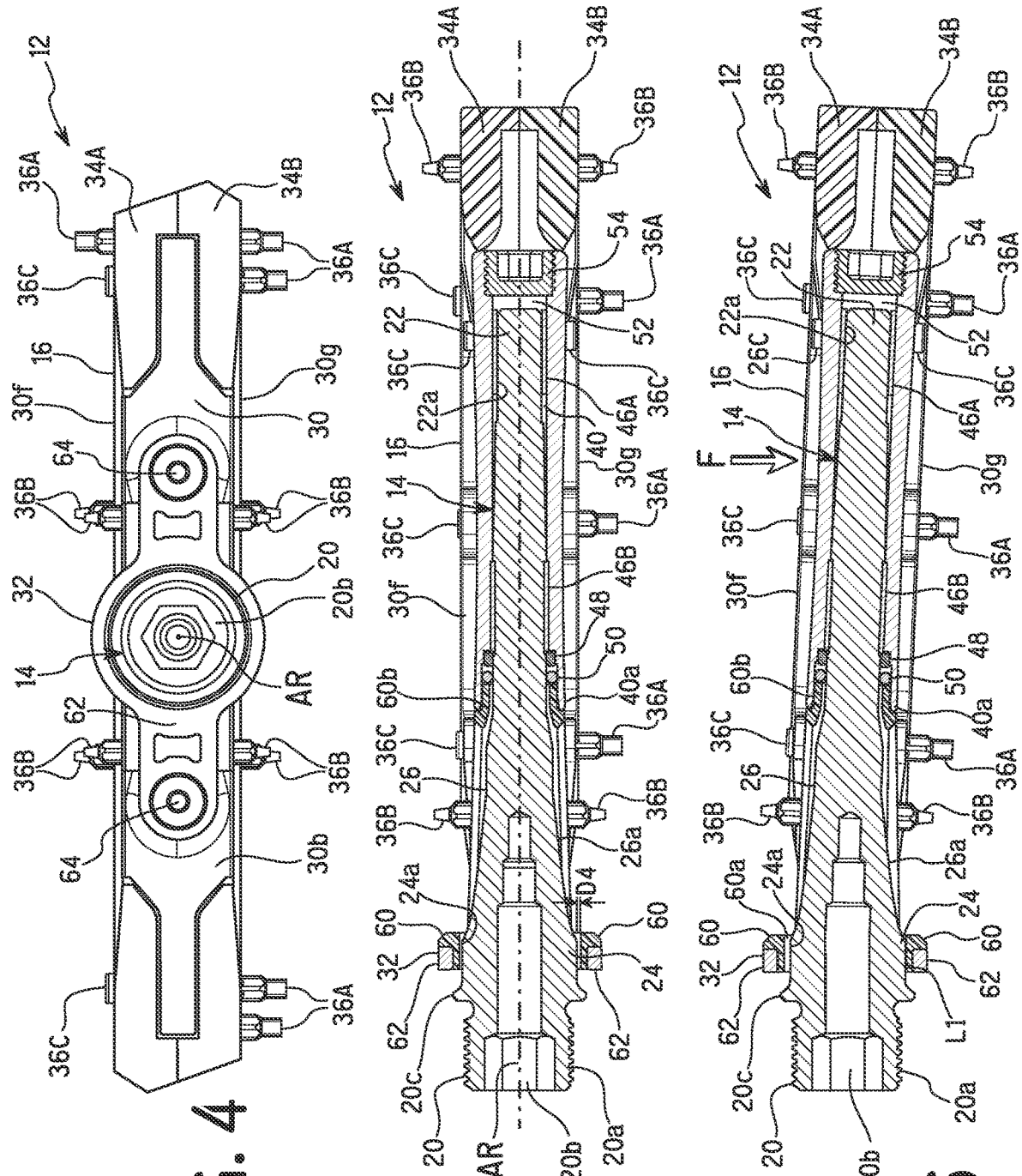

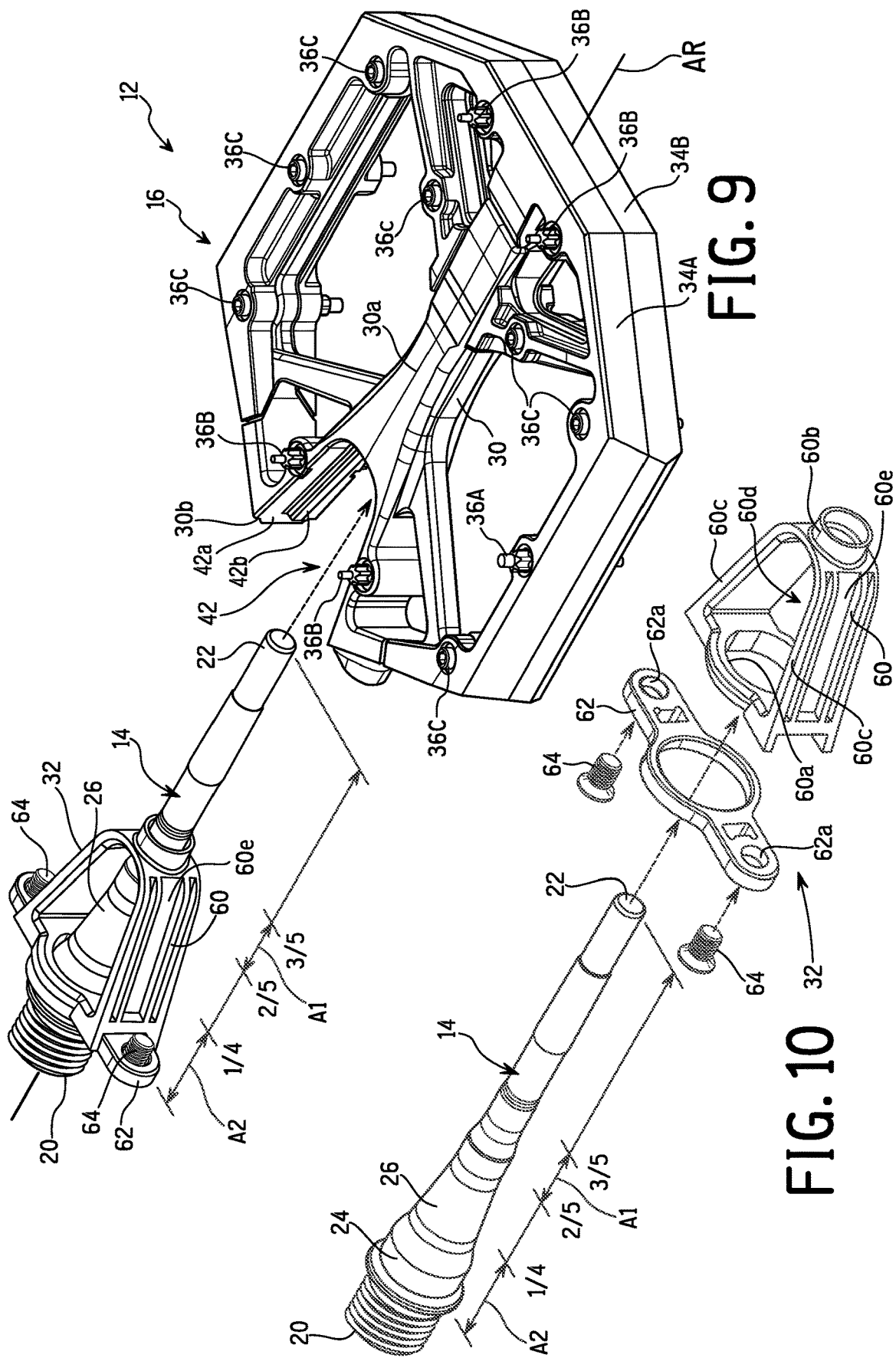

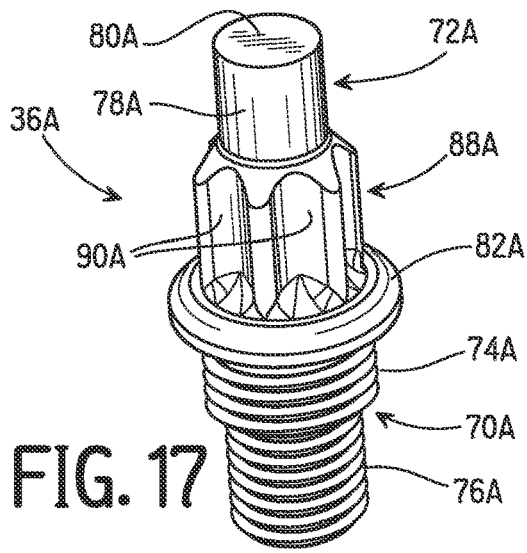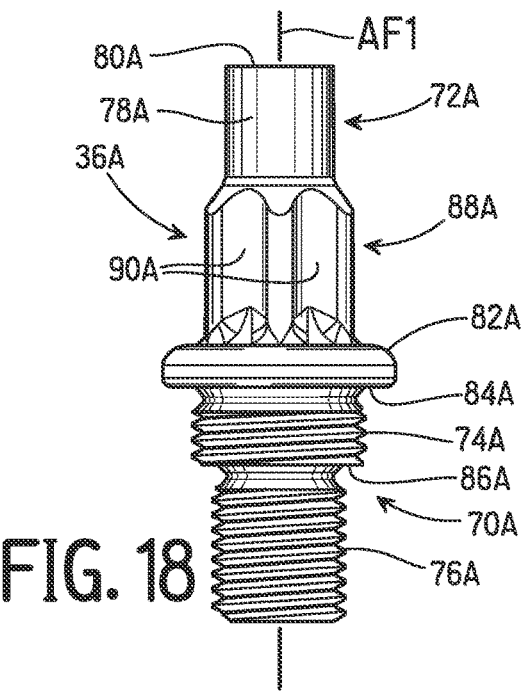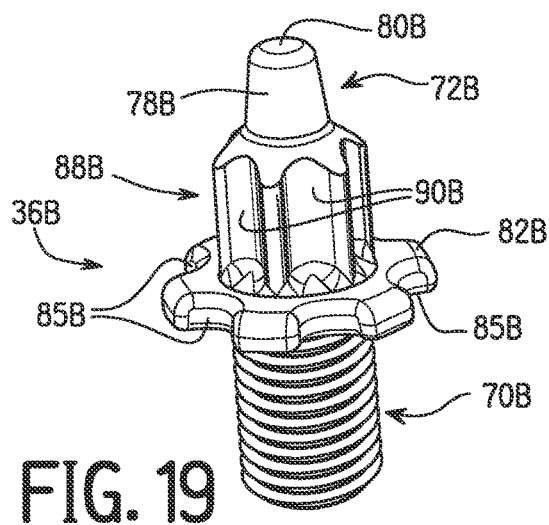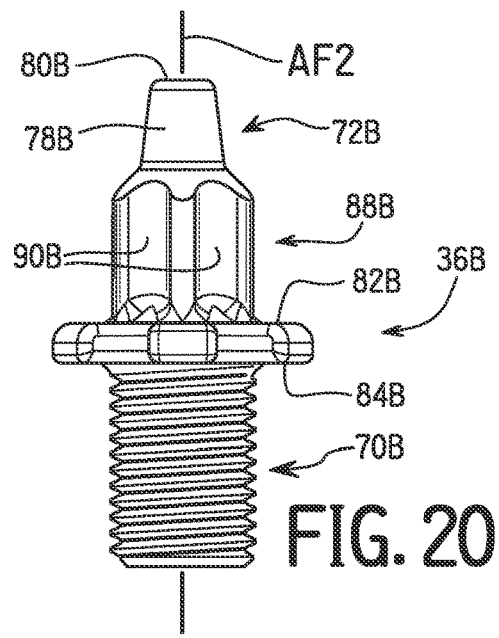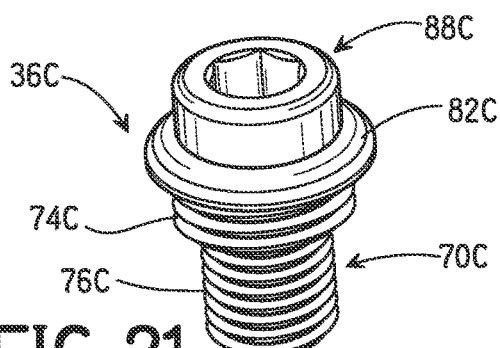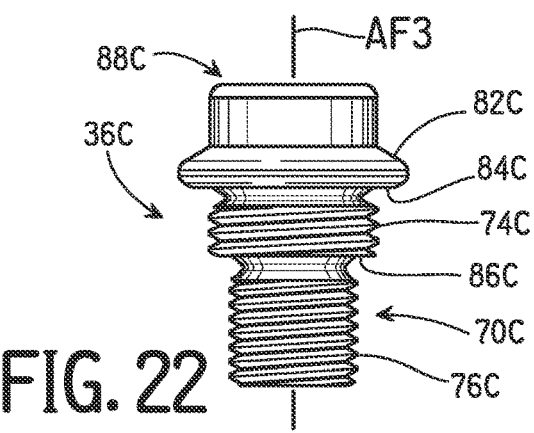

BICYCLE PEDAL

BACKGROUND

Technical Field

This disclosure generally relates to a bicycle pedal. More specifically, the present disclosure relates to a thin bicycle pedal with improved strength and interchangeable spiked fasteners to improve the rider's grip on the pedal surface.

Background Information

Generally, a bicycle pedal is an essential component of most bicycles which is used to transfer cycling power to the bicycle's drive train. Different styles of bicycles utilize different pedal styles that are designed for a specific purpose such as for pleasure, off road biking, road racing, etc. Typically, a bicycle pedal includes a pedal shaft and a pedal body, with the pedal shaft rotatably supporting the pedal body at the end of a crank which is attached to the drive train. When a rider drives the crank by pedaling the pedal body, the rotation of the crank causes the rotation one or more wheel of the bicycle.

Recently, a demand for lighter pedals has led to thinner pedals. Besides being lighter, a thinner pedal increases the distance from the pedal to the ground, making it difficult for the pedal to hit the ground when the bicycle is tilted. A thinner pedal also improves pedal stability while riding, because the distance from the axis of the pedal shaft to the surface of the pedal body is shortened. However, thinner pedals require a pedal shaft with a small diameter, and the small diameter of the pedal shaft reduces the strength of the pedal shaft when a large load is applied by a rider.

SUMMARY

Generally, the present disclosure is directed to various features of a bicycle pedal for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a bicycle pedal is provided that comprises a pedal shaft and a pedal body. The pedal shaft has a first end portion that is configured to be attached to a bicycle crank, a second end portion that is on an opposite side of the first end portion in an axial direction with respect to a rotational center axis of the pedal shaft, and a contact portion located between the first end portion and the second end portion in the axial direction. The pedal body has a body part rotatably supported by the pedal shaft and a load receiving part located at a position corresponding to the contact portion of the pedal shaft along the rotational center axis. The load receiving part is configured to receive a load from the contact portion of the pedal shaft. The load receiving part is at least partly spaced from the contact portion under a no load condition and contacts the contact portion upon a load applied to the pedal body from a rider. With the bicycle pedal according to the first aspect, it is possible to improve pedal stability under a large load from a rider.

In accordance with a second aspect of the present disclosure, the bicycle pedal according to the first aspect is configured so that the load receiving part includes a load receiving contact portion that contacts the contact portion of the pedal shaft upon the load being applied to the pedal body from the rider. At least one of the load receiving contact portion of the load receiving part and the contact portion of the pedal shaft includes resin material. With the bicycle pedal according to the second aspect, it is possible to distribute the load received from the rider and decrease wear of the pedal parts.

In accordance with a third aspect of the present disclosure, the bicycle pedal according to the second aspect is configured so that the load receiving part further includes a support portion that supports the load receiving contact portion. The support portion includes metallic material. With the bicycle pedal according to the third aspect, it is possible to improve the stability of the bicycle pedal.

In accordance with a fourth aspect of the present disclosure, the bicycle pedal according to any of the first to third aspects is configured so that the load receiving part is at least partly spaced from the contact portion by a distance under the no load condition. The distance ranges from 0.2 mm to 0.8 mm. With the bicycle pedal according to the fourth aspect, it is possible to enable the pedal body to rotate smoothly around the pedal shaft.

In accordance with a fifth aspect of the present disclosure, the bicycle pedal according to any of the first to fourth aspects is configured so that the contact portion has a first outermost diameter that is larger than a second outermost diameter of the second end portion. With the bicycle pedal according to the fifth aspect, it is possible to distribute the load received from the rider to a thicker portion of the pedal shaft.

In accordance with a sixth aspect of the present disclosure, the bicycle pedal according to any of the first to fifth aspects is configured so that the load receiving part includes a support portion that is attached to the body part. With the bicycle pedal according to the sixth aspect, it is possible to improve the stability of the bicycle pedal.

In accordance with a seventh aspect of the present disclosure, the bicycle pedal according to the sixth aspect is configured so that the support portion of the load receiving part is attached to the body part by at least one fastener. With the bicycle pedal according to the seventh aspect, it is possible to improve the stability of the bicycle pedal.

In accordance with an eighth aspect of the present disclosure, the bicycle pedal according to any of the first to seventh aspects is configured so that the body part includes a pedal shaft receiving bore configured to receive at least the second end portion of the pedal shaft. With the bicycle pedal according to the eighth aspect, it is possible to enable the pedal body to rotate smoothly around the pedal shaft.

In accordance with a ninth aspect of the present disclosure, the bicycle pedal according to the eighth aspect is configured so that the load receiving part is spaced axially from an entrance opening of the pedal shaft receiving bore along the rotational center axis of the pedal shaft. With the bicycle pedal according to the ninth aspect, it is possible to distribute the load received from the rider away from the pedal shaft receiving bore.

In accordance with a tenth aspect of the present disclosure, the bicycle pedal according to the ninth aspect is configured so that the pedal shaft has an exposed portion that is disposed outside of the pedal body between the load receiving part and the entrance opening of the pedal shaft receiving bore. With the bicycle pedal according to the tenth aspect, it is possible to distribute the load received from the rider away from the pedal shaft receiving bore.

In accordance with an eleventh aspect of the present disclosure, the bicycle pedal according to any of the first to tenth aspects is configured so that the load receiving part absorbs at least a portion of a force applied to the pedal body in a direction perpendicular to the rotational center axis of the pedal shaft. With the bicycle pedal according to the eleventh aspect, it is possible to improve the stability of the bicycle pedal under a load from a rider.

In accordance with a twelfth aspect of the present disclosure, the bicycle pedal according to any of the first to eleventh aspects is configured so that the load receiving part includes a pedal shaft receiving aperture that encircles the contact portion of the pedal shaft. With the bicycle pedal according to the twelfth aspect, it is possible to enable the pedal body to rotate smoothly around the pedal shaft.

In accordance with a thirteenth aspect of the present disclosure, the bicycle pedal according to any of the first to twelfth aspects is configured so that the body part is rotatably supported by at least one sliding bearing disposed on at least the second end portion of the pedal shaft. With the bicycle pedal according to the thirteenth aspect, it is possible to enable the pedal body to rotate smoothly around the pedal shaft.

In accordance with a fourteenth aspect of the present disclosure, the bicycle pedal according to the thirteenth aspect is configured so that the at least one sliding bearing includes a first sliding bearing disposed on the second end portion of the pedal shaft and a second sliding bearing disposed between the first sliding bearing and the contact portion. With the bicycle pedal according to the fourteenth aspect, it is possible to enable the pedal body to rotate smoothly around the pedal shaft.

In accordance with a fifteenth aspect of the present disclosure, a bicycle pedal is provided that comprises a pedal shaft and a pedal body. The pedal shaft has a rotational center axis. The pedal body is rotatably supported by the pedal shaft around the rotational center axis. The pedal body includes a body part receiving the pedal shaft, and at least one resin tread part attached to the body part by at least one threaded fastener that includes a threaded portion screwed into a fixing hole in the body part and a spike portion that protrudes outwardly with respect to the resin tread part. With the bicycle pedal according to the fifteenth aspect, it is possible to provide a stable bicycle pedal which can be gripped by a rider's shoe.

In accordance with a sixteenth aspect of the present disclosure, the bicycle pedal according to the fifteenth aspect is configured so that the at least one threaded fastener includes a tool-engagement portion located between the spike portion and the threaded portion. With the bicycle pedal according to the sixteenth aspect, it is possible to easily construct the pedal body.

In accordance with a seventeenth aspect of the present disclosure, the bicycle pedal according to the sixteenth aspect is configured so that the tool-engagement portion includes a plurality of grooves which extend parallel to a fastener axis of the at least one threaded fastener. With the bicycle pedal according to the seventeenth aspect, it is possible to easily construct the pedal body.

In accordance with an eighteenth aspect of the present disclosure, the bicycle pedal according to the sixteenth or seventeenth aspects is configured so that the tool-engagement portion includes a first tool-engagement portion and a second tool-engagement portion arranged in a fastener axial direction with respect to a fastener axis of the at least one threaded fastener, and the first tool-engagement portion and the second tool-engagement portion have a different profile with respect to each other. With the bicycle pedal according to the eighteenth aspect, it is possible to easily construct the pedal body.

In accordance with a nineteenth aspect of the present disclosure, the bicycle pedal according to any of the fifteenth to eighteenth aspects is configured so that the spike portion includes a plurality of circumferential grooves or at least one spiral groove. With the bicycle pedal according to the nineteenth aspect, it is possible to improve the grip between the bicycle pedal and the rider's shoe.

In accordance with a twentieth aspect of the present disclosure, the bicycle pedal according to any of the fifteenth to nineteenth aspects is configured so that the at least one threaded fastener includes a head portion having an abutment surface that contacts an outer surface of the at least one resin tread part. With the bicycle pedal according to the twentieth aspect, it is possible to improve the contact between parts of the pedal body.

In accordance with a twenty-first aspect of the present disclosure, the bicycle pedal according to any of the fifteenth to twentieth aspects is configured so that the at least one threaded fastener includes a plurality of threaded fasteners. With the bicycle pedal according to the twenty-first aspect, it is possible to improve the grip between the bicycle pedal and the rider's shoe.

In accordance with a twenty-second aspect of the present disclosure, the bicycle pedal according to any of the fifteenth to twenty-first aspects is configured so that the threaded portion includes a first threaded section and a second threaded section. The first threaded section has a larger diameter than the second threaded section. The first threaded section is provided at the at least one resin tread part, and the second threaded section is screwed into the body part. With the bicycle pedal according to the twenty-second aspect, it is possible to improve the contact between parts of the pedal body.

In accordance with a twenty-third aspect of the present disclosure, the bicycle pedal according to the twenty-second aspect is configured so that the at least one resin tread part has a through-hole through which the threaded fastener passes. At least one screw thread of the first threaded section contacts a side wall of the through-hole. With the bicycle pedal according to the twenty-third aspect, it is possible to improve the contact between parts of the pedal body.

In accordance with a twenty-fourth aspect of the present disclosure, the bicycle pedal according to the twenty-second or twenty-third aspects is configured so that the at least one threaded fastener includes an additional abutment surface between the first threaded section and the second threaded section in a fastener direction with respect to a fastener axis of the at least one threaded fastener. The additional abutment surface contacts an outer surface of the body part. With the bicycle pedal according to the twenty-fourth aspect, it is possible to improve the contact between parts of the pedal body.

In accordance with a twenty-fifth aspect of the present disclosure, the bicycle pedal according to any of the fifteenth to twenty-fourth aspects is configured so that the body part includes a first side and a second side that is on an opposite side of the first side with respect to the body part. The at least one threaded fastener includes a plurality of threaded fasteners. The at least one resin tread part includes a first resin tread part and a second resin tread part. The first resin tread part is attached to the first side of the body part by at least some of the plurality of threaded fasteners, and the second resin tread part is attached to the second side of the body part by at least some of the plurality of threaded fasteners. With the bicycle pedal according to the twenty-fifth aspect, it is possible to construct a stable bicycle pedal which can be used by a rider in multiple orientations.

In accordance with a twenty-sixth aspect of the present disclosure, a bicycle pedal is provided that comprises a pedal shaft and a pedal body. The pedal shaft has a rotational center axis. The pedal body is rotatably supported by the pedal shaft around the rotational center axis. The pedal body includes a body part receiving the pedal shaft, and at least one resin tread part attached to the body part by at least one threaded fastener that includes a first threaded section and a second threaded section. The first threaded section has a larger diameter than the second threaded section. The first threaded section is provided at the resin tread part, and the second threaded section is screwed into the body part. With the bicycle pedal according to the twenty-sixth aspect, it is possible to improve the contact between parts of the pedal body.

In accordance with a twenty-seventh aspect of the present disclosure, the bicycle pedal according to the twenty-sixth aspect is configured so that the at least one resin tread part has a through-hole through which the threaded fastener passes. At least one screw thread of the first threaded section contacts a side wall of the through-hole. With the bicycle pedal according to the twenty-seventh aspect, it is possible to improve the contact between parts of the pedal body.

In accordance with a twenty-eighth aspect of the present disclosure, the bicycle pedal according to the twenty-sixth or twenty-seventh aspects is configured so that the at least one threaded fastener includes a head portion having an abutment surface that contacts an outer surface of the at least one resin tread part. With the bicycle pedal according to the twenty-eighth aspect, it is possible to improve the contact between parts of the pedal body.

In accordance with a twenty-ninth aspect of the present disclosure, the bicycle pedal according to any of the twenty-sixth to twenty-eighth aspects is configured so that the at least one threaded fastener includes an additional abutment surface between the first threaded section and the second threaded section in a fastener direction with respect to a fastener axis of the at least one threaded fastener. The additional abutment surface contacts an outer surface of the body part. With the bicycle pedal according to the twenty-ninth aspect, it is possible to improve the contact between parts of the pedal body.

In accordance with a thirtieth aspect of the present disclosure, the bicycle pedal according to any of the twenty-sixth to twenty-ninth aspects is configured so that the at least one threaded fastener includes a plurality of threaded fasteners. With the bicycle pedal according to the thirtieth aspect, it is possible to improve the contact between parts of the pedal body.

In accordance with a thirty-first aspect of the present disclosure, the bicycle pedal according to any of the twenty-sixth to thirtieth aspects is configured so that the body part includes a first side and a second side that is on an opposite side of the first side with respect to the body part. The at least one threaded fastener includes a plurality of threaded fasteners. The at least one resin tread part includes a first resin tread part and a second resin tread part. The first resin tread part is attached to the first side of the body part by at least some of the plurality of threaded fasteners, and the second resin tread part is attached to the second side of the body part by at least some of the plurality of threaded fasteners. With the bicycle pedal according to the thirty-first aspect, it is possible to construct a stable bicycle pedal which can be used by a rider in multiple orientations.

In accordance with a thirty-second aspect of the present disclosure, a threaded fastener for a bicycle pedal comprises a first threaded section having a first diameter, the first threaded section configured to be provided in a hole formed in the bicycle pedal, and a second threaded section having a second diameter that is smaller than the first diameter, the second threaded section configured to screw into the bicycle pedal. With the threaded fastener according to the thirty-second aspect, it is possible to improve the contact between parts of the bicycle pedal.

In accordance with a thirty-third aspect of the present disclosure, the threaded fastener according to the thirty-second aspect is configured so that the first threaded section is configured to be provided at a tread part of the bicycle pedal, and the second threaded section is configured to be screwed into a body part of the bicycle pedal. With the threaded fastener according to the thirty-third aspect, it is possible to improve the contact between parts of the bicycle pedal.

In accordance with a thirty-fourth aspect of the present disclosure, the threaded fastener according to the thirty-third aspect is configured so that the threaded fastener includes a spike portion configured to protrude outwardly with respect to the tread part. With the threaded fastener according to the thirty-fourth aspect, it is possible to improve the grip between the bicycle pedal and the rider's shoe.

In accordance with a thirty-fifth aspect of the present disclosure, a spike pin for a bicycle pedal comprises a spike portion configured to protrude outwardly with respect to a tread part of the bicycle pedal, a threaded portion configured to screw into the bicycle pedal, and a tool-engagement portion located between the spike portion and the threaded portion. With the spike pin according to the thirty-fifth aspect, it is possible to improve the grip between the bicycle pedal and the rider's shoe.

In accordance with a thirty-sixth aspect of the present disclosure, the spike pin according to the thirty-fifth aspect is configured so that the tool-engagement portion includes a first tool-engagement portion and a second tool-engagement portion arranged in a spike pin axial direction with respect to a spike pin axis of the spike pin. The first tool-engagement portion and the second tool-engagement portion have a different profile with respect to each other. With the spike pin according to the thirty-sixth aspect, it is possible to easily construct the bicycle pedal.

Also, other objects, features, aspects and advantages of the disclosed bicycle pedal will become apparent to those skilled in the art from the following detailed description, which, taken in conjunction with the annexed drawings, discloses preferred embodiments of the bicycle pedal.

BRIEF DESCRIPTION OF THE DRAWINGS

Referring now to the attached drawings which form a part of this original disclosure:

FIG. 4 is an inside elevational view of the bicycle pedal illustrated in FIG. 1;

FIG. 5 is a side cross-sectional view, taken from a section line 5-5 in FIG. 2, showing the bicycle pedal illustrated in FIG. 1 in a no load condition;

FIG. 6 is a side cross-sectional view showing the bicycle pedal as viewed in FIG. 5 as a load is applied by a rider;

FIG. 9 is another exploded top perspective view of the bicycle pedal illustrated in FIG. 1;

FIG. 10 is an exploded top perspective view of the pedal shaft and the load receiving part of the bicycle pedal illustrated in FIG. 1;

FIG. 17 is top perspective view of a fastener for the bicycle pedal of FIG. 1 in accordance with a first embodiment;

FIG. 18 is a side elevational view of the fastener of FIG. 17;

FIG. 19 is top perspective view of a fastener for the bicycle pedal of FIG. 1 in accordance with a second embodiment;

FIG. 20 is a side elevational view of the fastener of FIG. 19;

FIG. 21 is top perspective view of a fastener for the bicycle pedal of FIG. 1 in accordance with a third embodiment;

FIG. 22 is a side elevational view of the fastener of FIG. 21;

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
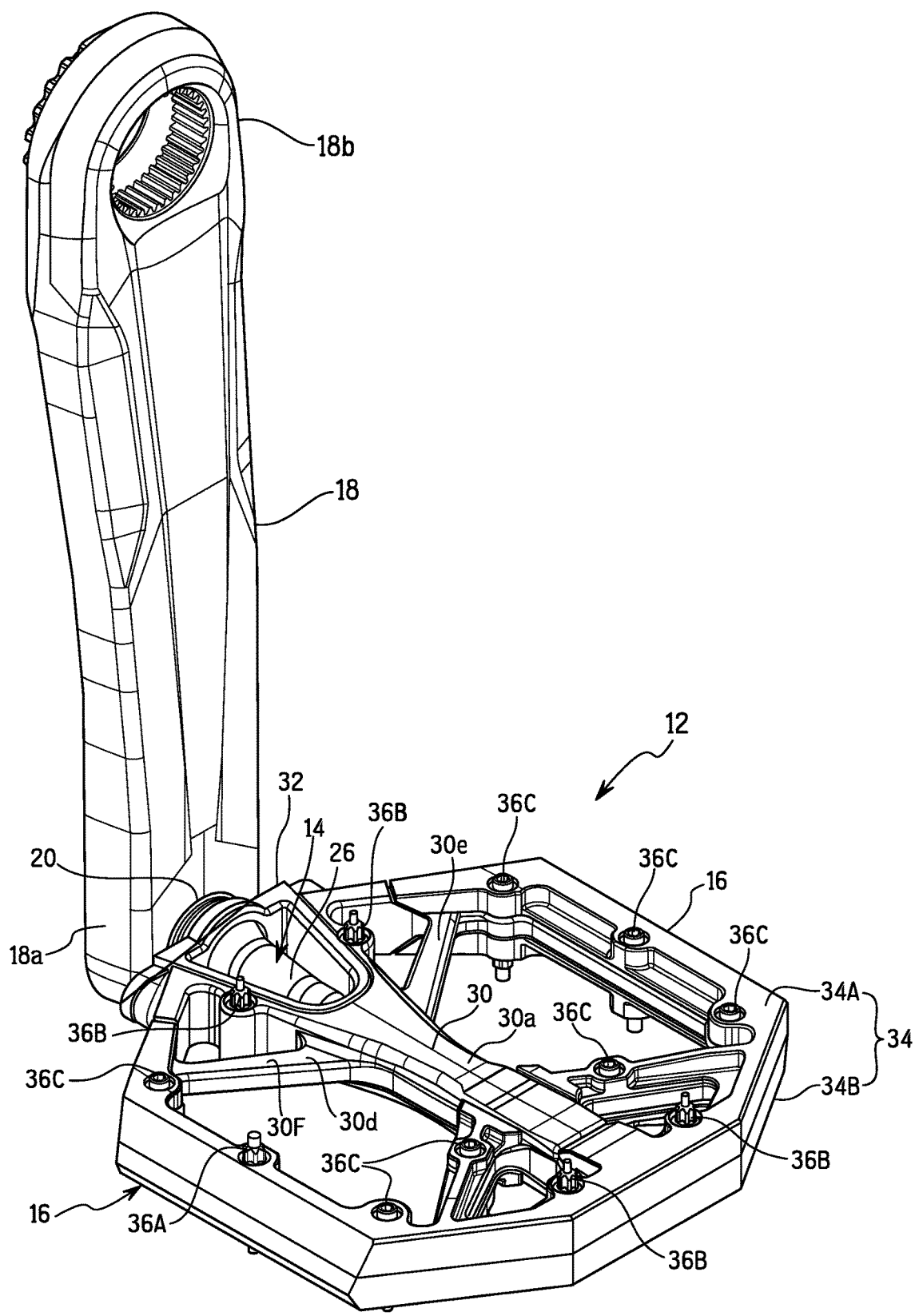
FIG. 1 is a top perspective view of a bicycle pedal attached to a bicycle crank in accordance with one embodiment.

Referring initially to FIG. 1, a bicycle pedal 12 for a human-powered vehicle is illustrated in accordance with a first embodiment. The bicycle pedal 12 comprises a pedal shaft 14 and a pedal body 16. The pedal shaft 14 has a rotational center axis AR. The pedal body 16 is rotatably supported by the pedal shaft 14 around the rotational center axis AR. The pedal shaft 14 also connects the pedal body 16 to the outer end 18*a* of a bicycle crank 18 such that the pedal body 16 can rotate with respect to the bicycle crank 18 around the rotational center axis AR of the pedal shaft 14. The inner end 18*b* of the bicycle crank 18 can be attached to a drive train of the human-powered vehicle, such that use of the bicycle pedal 12 rotates the bicycle crank and causes the rotation of one or more wheel of the human-powered vehicle.

FIGS. 5, 6 and 10 show the pedal shaft 14 in more detail. As illustrated, the pedal shaft 14 is an elongated rod which has a longitudinal length extending along a rotational center axis AR. The pedal shaft 14 comprises a first end portion 20, a second end portion 22, and a contact portion 24. The pedal shaft can further comprise an exposed portion 26. Each of the first end portion 20, the second end portion 22, the contact portion 24, and the exposed portion 26 is located along the rotational center axis AR. The pedal shaft 14 can be formed, for example, as a single part made of a metal material such as carbon steel or chrome molybdenum steel.

The first end portion 20 is configured to be attached to the bicycle crank 18. More specifically, the first end portion 20 is configured to be attached to the outer end 18*a* of the bicycle crank 18. For attachment to the bicycle crank 18, the first end portion 20 can include at least one of an outer thread 20*a*, a crank attachment bore 20*b*, and a lip 20*c*. Here, the outer thread 20*a* encircles the perimeter of the first end portion 20 and can be threaded into a corresponding aperture at the outer end 18*a* of the bicycle crank 18 until the lip 20*c* presses against an outer surface of the bicycle crank 18. A screw, nut and bolt, or other attachment device can then be screwed into the crank attachment bore 20*b* from the opposite side of the outer end 18*a*. In this way, the pedal shaft 14 can rotatably support the pedal body 16 relative to the bicycle crank 18, with the pedal body 16 rotating around the rotational center axis AR of the pedal shaft 14.

The second end portion 22 is located on an opposite side of the pedal shaft 14 as the first end portion 20 in an axial direction with respect to the rotational center axis AR. As described in more detail below, the second end portion 22 is configured to slide into the pedal body 16 so as to rotatably support the pedal body 16 on the bicycle crank 18. As seen in FIG. 5, the diameter of the pedal shaft 14 remains constant or substantially constant proximal to the second end portion 22 to facilitate entry of the second end portion 22 into the pedal body 16 and to enable the pedal body 16 to rotate freely around the second end portion 22.

The contact portion 24 is located between the first end portion 20 and the second end portion 22 in the axial direction. More specifically, the contact portion 24 is located between the first end portion 20 and the second end portion 22 in the axial direction with respect to the rotational center axis AR of the pedal shaft 14. The contact portion 24 is also located between the first end portion 20 and the exposed portion 26 in the axial direction with respect to the rotational center axis AR of the pedal shaft 14. As described in more detail below, the contact portion 24 of the pedal shaft 14 contacts a portion of the pedal body 16 when a load is applied by a rider, thus absorbing at least part of the rider's load. However, the contact portion 24 does not contact the same portion of the pedal body 16 under a no load condition. Here, the contact portion 24 is located proximal to the first end portion 20 in comparison to the second end portion 22 in the direction of the rotational center axis AR. The contact portion 24 of the pedal shaft 14 can be provided, for example, near the lip 20c. In this way, the contact portion 24 can be located proximal to the outer end 18a of the bicycle crank 18 when the pedal shaft 14 is attached to the bicycle crank 18. This enables the rider's load to be distributed near the bicycle crank 18, thus decreasing the amount of vertical displacement of the pedal body 16 caused by the rider's load.

The exposed portion 26 of the pedal shaft 14 is located between the contact portion 24 and the second end portion 22 in the axial direction with respect to the rotational center axis AR of the pedal shaft 14. As described in more detail below, the exposed portion 26 is exposed outside of the pedal body 16 between the contact portion 24 and the second end portion 22. By exposing the exposed portion 26 in this manner, the pedal shaft 14 is able to flex at the exposed portion 26 under the rider's load without rubbing against an inner surface of the pedal body 16, while at the same time enabling transfer of at least part of the rider's load to the contact portion 24.

The outer contour of the pedal shaft 14 at the exposed portion 26 can be formed in a variety of ways. Here, as seen in FIG. 5, the diameter 26a of the exposed portion 26 generally tapers inwardly to decrease from the contact portion 24 toward the second end portion 22. The diameter of the pedal shaft 14 then remains generally constant along most of the longitudinal length of the pedal shaft 14 located within the pedal body 16 between the exposed portion 26 and the second end portion 22. Those of ordinary skill in the art will recognize from this disclosure that the pedal shaft 14 can also have an uneven taper or segments which increase or decrease in diameter between contact portion 24 and the second end portion 22.

As seen in FIG. 5, the contact portion 24 has a first outermost diameter 24a that is larger than a second outermost diameter 22a of the second end portion 22. As used herein, the "outermost diameter" refers to the largest diameter of a respective portion of the pedal shaft 14. By forming the first outermost diameter 24a of the contact portion 24 to be larger than the second outermost diameter 22a of the second end portion 22 as shown, a thicker section of the pedal shaft 14 at the contact portion 24 is configured to receive at least part of the rider's load applied nearer to a thinner section of the pedal shaft 14 at the second end portion 22. As seen in FIG. 5, the diameter of the pedal shaft 14 also protrudes outwardly from the first outermost diameter 24a between the contact portion 24 and the first end portion 20, such that the outermost diameter at the first end portion 20 creates the lip 20c for contact with the bicycle crank 18. The pedal shaft 14 generally has a larger diameter at the first end portion 20 than at the second end portion 22. Since a large load is applied to the large diameter portion of the pedal shaft 14, it is easy to obtain the strength of the pedal shaft 14 against the load.

As seen in FIGS. 7 to 10, the pedal body 16 can comprise a body part 30 and a load receiving part 32. Alternatively, or in combination, the pedal body 16 can comprise the body part 30, at least one resin tread part 34, and at least one threaded fastener 36. Here, the body part 30 and the load receiving part 32 are shown as separate parts, but in an alternative embodiment the body part 30 and the load receiving part 32 can be formed together as a single part. The at least one tread part 34 is formed separately from the body part 30 and is attached to the body part 30 by the at least one threaded fastener 36, as described in more detail below. In the embodiments described below, it is assumed that the tread part is made of resin. The tread part is mainly described as a resin tread part. The resin tread part makes the pedal lighter and restricts a fastener from loosening, as will be described later. However, the material of the tread part is not limited to resin. At least when the effect of restricting the fastener from loosening is not expected, the tread part may be made of a material other than resin. Therefore, the tread part is also given the same reference numeral as the resin tread part.

Figure 7:
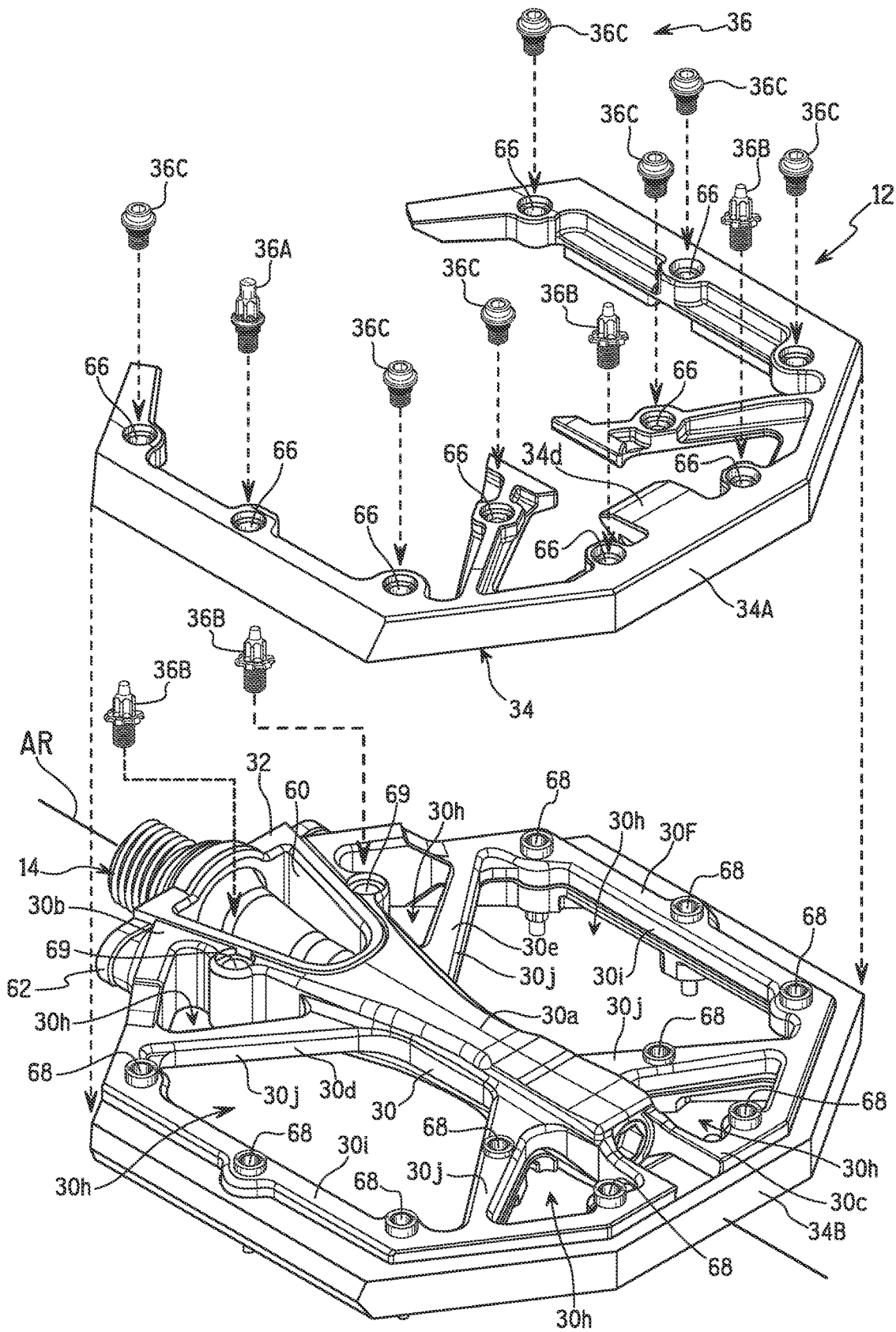
FIG. 7 is an exploded top perspective view of the top of the bicycle pedal illustrated in FIG. 1.
Figure 8:
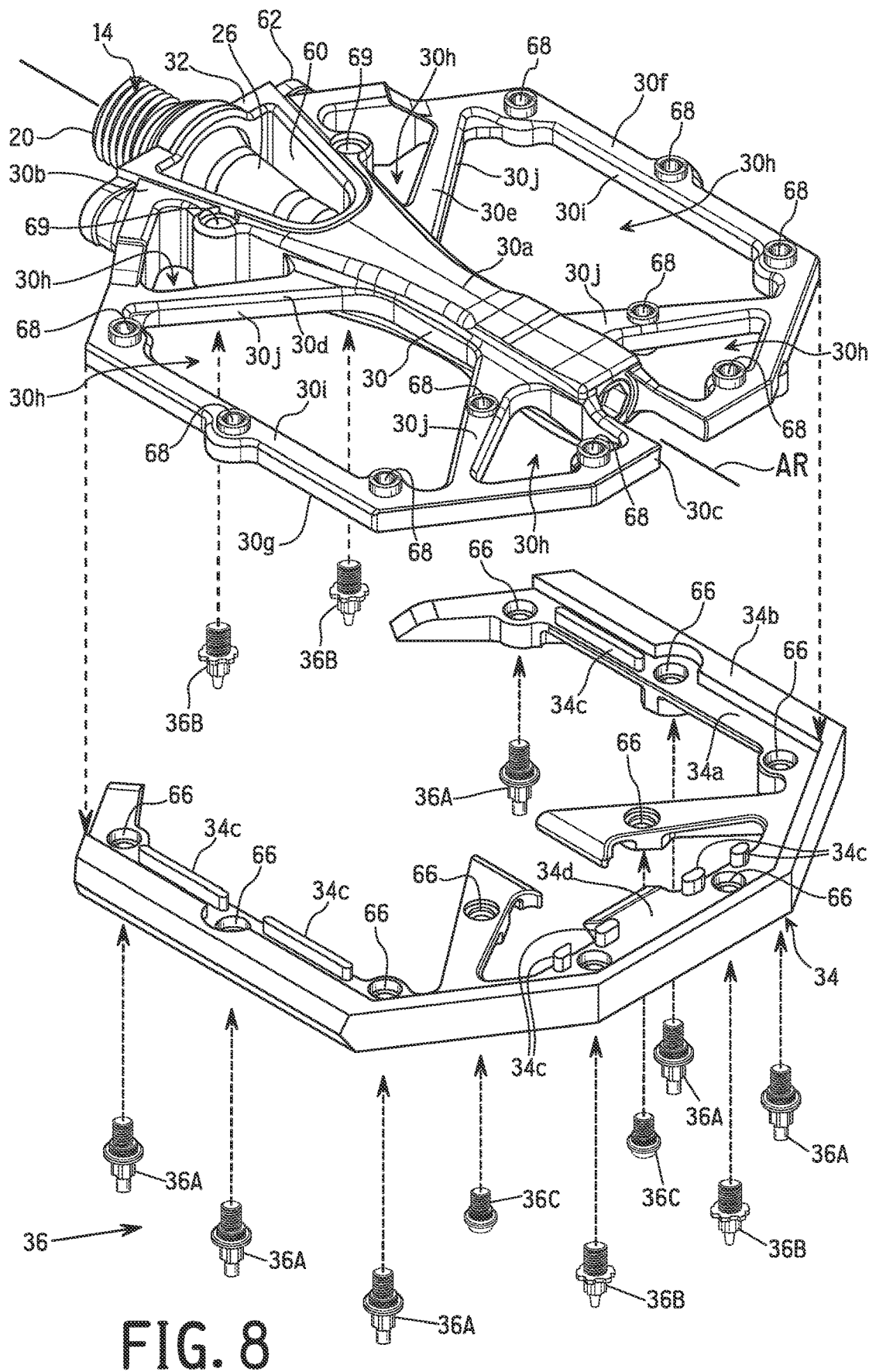
FIG. 8 is an exploded top perspective view of the bottom of the bicycle pedal illustrated in FIG. 1.

As seen in FIGS. 7 to 9, the body part 30 includes a center portion 30a which extends along the rotational center axis AR of the pedal shaft 14 from a crank end side 30b to a free end side 30c, a first side portion 30d which extends radially outward from one side of the center portion 30a with respect to the rotational center axis AR, and a second side portion 30e which extends radially outward from the opposite side of the center portion 30a with respect to the rotational center axis AR. For example, in the case where the body part 30 is plate-shaped, the first side portion 30d and the second side portion 30e are portions in the lateral direction around the rotation axis AR of the body part 30. The body part 30 can include a first side 30f and a second side 30g that is on an opposite side of the first side 30f with respect to the body part 30. For example, in the case where the body part 30 is plate-shaped, the first side 30f and the second side 30g correspond to the front side and the back side of the body part 30. The first side 30f and the second side 30g face each other in the thickness direction of the body part 30. As will be described later, the resin tread part 34A is attached to the first side 30f, and the resin tread part 34B is attached to the second side 30g. An axis parallel to the thickness direction, an axis parallel to the lateral direction, and the rotational center axis AR are orthogonal to each other. The center portion 30a, the first side portion 30d, and the second side portion 30e can extend between the first side 30f (e.g., the "top" side in FIGS. 7 to 9) and the second side 30g (e.g., the "bottom" side in FIGS. 7 to 9). The first side portion 30d and the second side portion 30e can further include one or more aperture 30h, which can be strategically placed and decrease the overall weight and material cost of the body part 30. As seen for example in FIG. 8, a plurality of apertures 30h can cause each of the first side portion 30d and the second side portion 30e to have an outer perimeter section 30i connected to the center portion 30a by one or more connecting section 30j.

Figure 11:
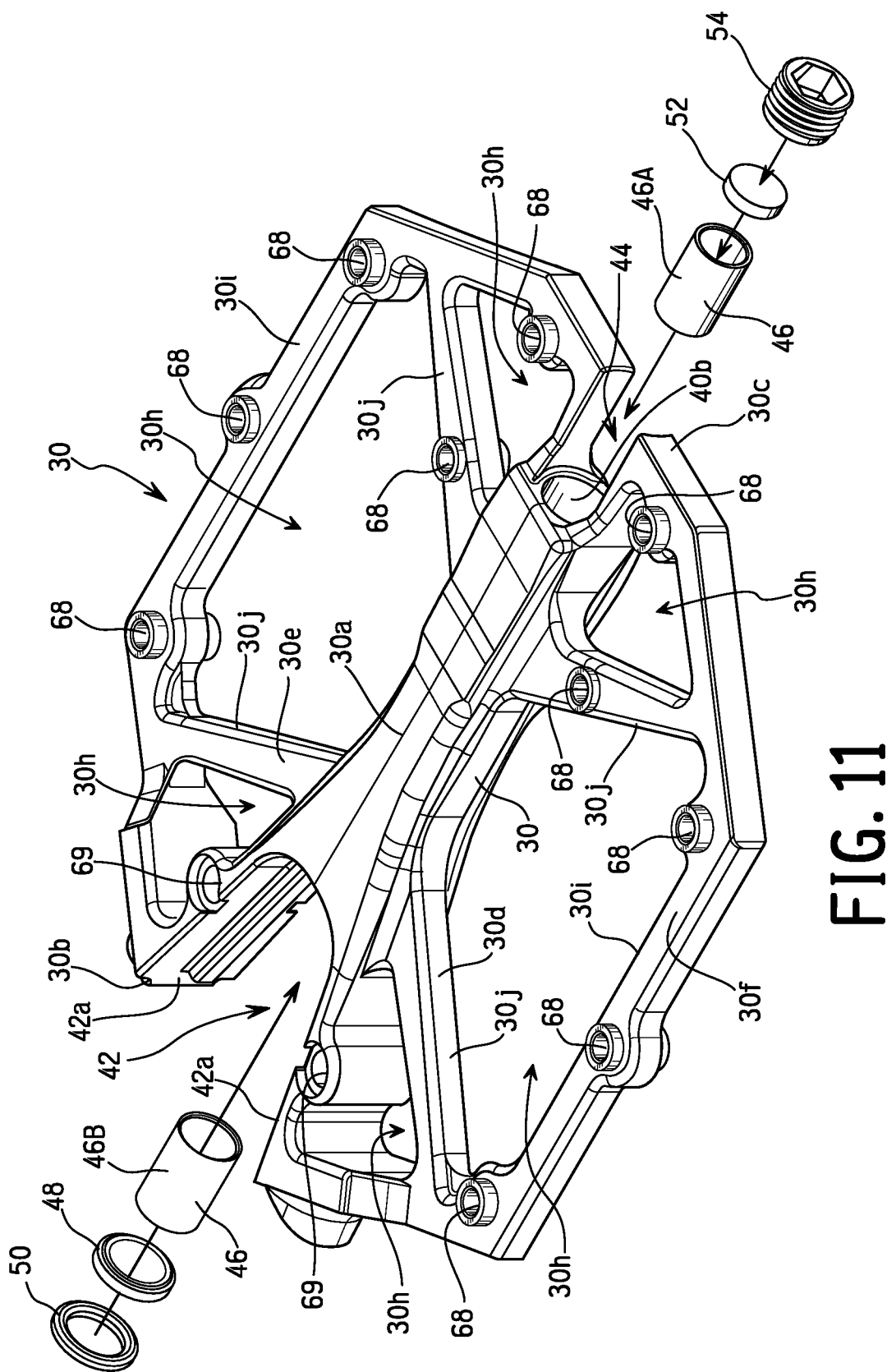
FIG. 11 is an exploded top perspective view of the body part of the bicycle pedal illustrated in FIG. 1.
Figure 12:
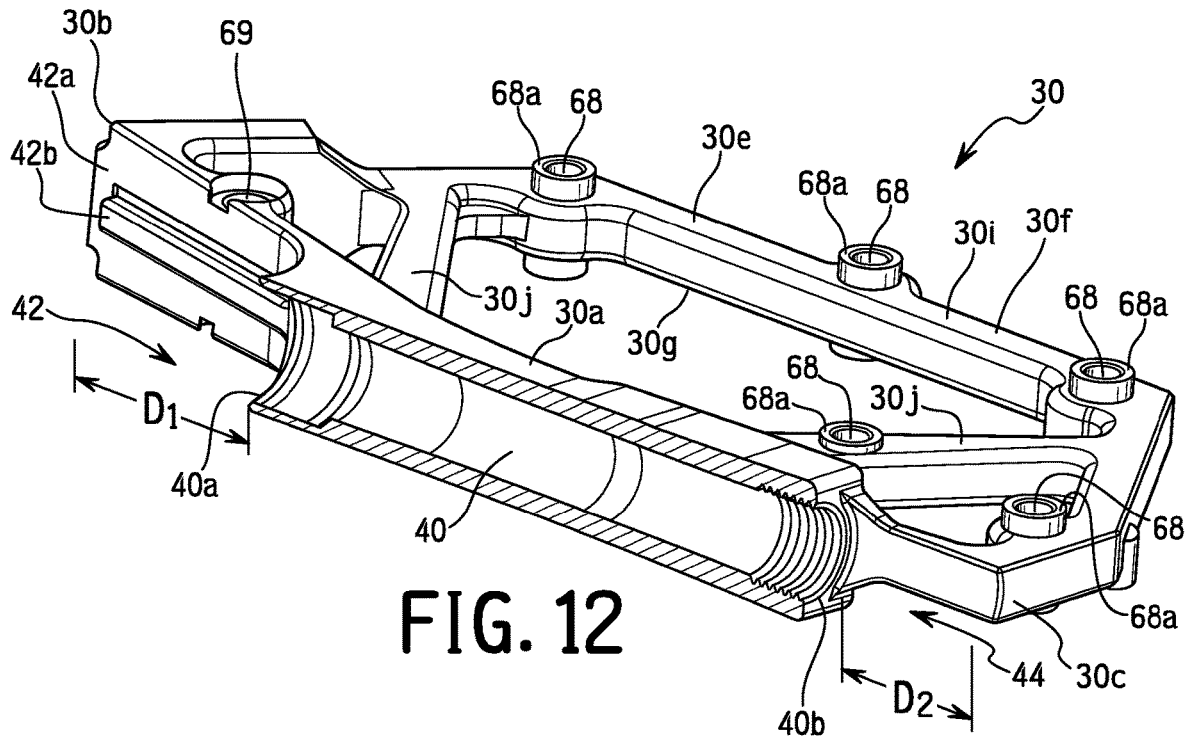
FIG. 12 is a cross-sectional perspective view showing half of the body part shown in FIG. 11.
Figure 13:
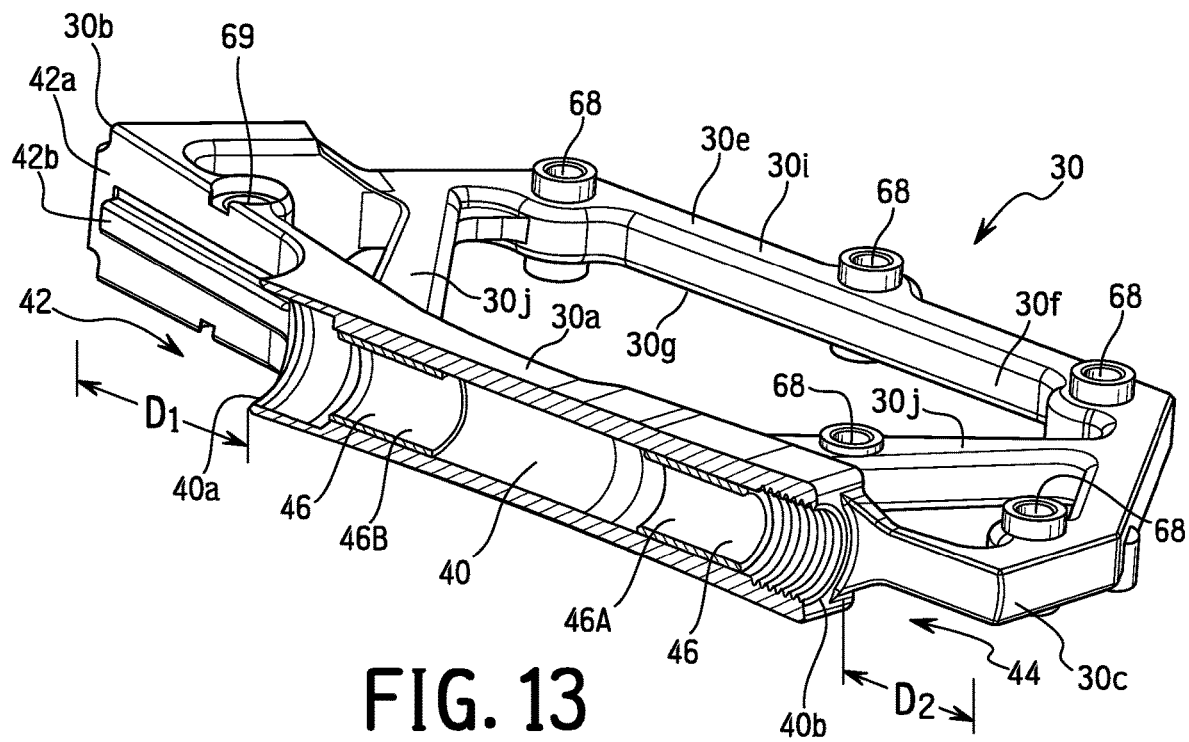
FIG. 13 is a cross-sectional perspective view showing half of the body part shown in FIG. 11 with sliding bearings installed.

The body part 30 is rotatably supported by the pedal shaft 14. The body part 30 receives the pedal shaft 14. The body part 30 can include a pedal shaft receiving bore 40 configured to receive at least the second end portion 22 of the pedal shaft 14. More specifically, the center portion 30a of the body part 30 can include the pedal shaft receiving bore 40 configured to receive at least the second end portion 22 of the pedal shaft 14. As seen in FIGS. 11 to 13, the pedal shaft receiving bore 40 can include an entrance opening 40a and an exit opening 40b. The entrance opening 40a is offset from the crank end side 30b of the body part 30 by a distance D1 to create a first gap 42, while the exit opening 40b is offset from the free end side 30c of the body part 30 by a distance D2 to create a second gap 44. The entrance opening 40a can receive at least one of a sliding bearing 46, a first O-ring 48, a second O-ring 50, and the second end portion 22 of the pedal shaft 14. The exit opening 40b can receive at least one of a sliding bearing 46, an end washer 52, and an end cap 54.

As seen in FIG. 5, the body part 30 is rotatably supported by at least one sliding bearing 46 disposed on at least the second end portion 22 of the pedal shaft 14. Here, the at least one sliding bearing 46 includes a first sliding bearing 46A disposed on the second end portion 22 of the pedal shaft 14 and a second sliding bearing 46B disposed between the first sliding bearing 46A and the contact portion 24.

The load receiving part 32 is more effective in a case where the pedal shaft 14 is supported by at least two bearings such as the first sliding bearing 46A and the second sliding bearing 46B. This is because in a case where there is one bearing (e.g., the first sliding bearing 46A) near the second end portion 22 of the pedal shaft 14, the axial length of the pedal shaft 14 from the first end portion 20 to a portion where the bearing is mounted on the pedal shaft 14 can be sufficiently long. Here, the bearing (e.g., the first sliding bearing 46A) is located at the small diameter portion of the pedal shaft 14. Then, by gradually reducing the diameter of the pedal shaft 14 from the first end portion 20 to the portion where the bearing (e.g., the first sliding bearing 46A) is mounted, the concentration of stress on the pedal shaft 14 can be easily suppressed. Especially in a case where the two bearings are separated from each other, the length of the reduced diameter portion becomes shorter and it becomes difficult to suppress the stress concentration on the pedal shaft 14.

To construct the pedal body 16 as shown in FIG. 5, the exit opening 40b receives the first sliding bearing 46A, then the end washer 52, and then the end cap 54. Similarly, the entrance opening 40a receives the second sliding bearing 46B, then the first O-ring 48, then the second O-ring 50, and then the second end portion 22 of the pedal shaft 14 (e.g., during or after attachment of the load receiving part 32 as seen in FIG. 9). When constructed as shown in FIG. 5, the first sliding bearing 46A and the second sliding bearing 46B enable smooth rotation of the pedal body 16 around the pedal shaft 14 with respect to the rotational center axis AR. At the same time, the load receiving part 32, the entrance first O-ring 48, the backup second O-ring 50, the end washer 52, and the end cap 54 create the appropriate spacing at the entrance opening 40a and the exit opening 40b. The first O-ring 48, the second O-ring 50, the end washer 52, and the end cap 54 further act to restrict unwanted dust and debris from entering the pedal shaft receiving bore 40 and interfering with rotation of the pedal body 16 around the pedal shaft 14. The at least one sliding bearing 46 can be located in the central portion of the pedal shaft 14 in the axial direction. In this embodiment, the second sliding bearing 46B is located in the central portion of the pedal shaft 14 in the axial direction of the pedal shaft 14. Alternatively, for example, at least one bearing (e.g., the second sliding bearing 46B) can be located in an area A1 (see, FIGS. 9 and 10) that is ⅖ to ⅗ of the axial length of the pedal shaft 14 from the outer surface of the lip 20. Generally, the pedal shaft diameter of the bearing portion is small. Since the pedal shaft diameter from the sliding bearing 46B to the second end portion 22 can be reduced, it is easy to reduce the thickness of the bicycle pedal 12.

The first O-ring 48 can be made, for example, with polyoxymethylene (POM) material, and can control the space between the pedal shaft 14 and the pedal body 16. The second O-ring 50 can be made, for example, with acrylonitrile-butadiene rubber (NBR), and can decrease friction between the pedal shaft 14 and the pedal body 16. The end washer 52 can be made, for example, with POM material, and can further decrease friction and create spacing at the tip of the second end portion 22 of the pedal shaft 14. The end cap 54 can be made of metal, and can include threads which mate with corresponding threads on an inner surface of the exit opening 40b to seal off the exit opening 40b and restrict unwanted dust and debris from entering the pedal shaft receiving bore 40.

FIGS. 9 and 10 show the load receiving part 32 in detail. As shown, the load receiving part 32 can include a load receiving contact portion 60 that contacts the contact portion 24 of the pedal shaft 14 upon a load being applied to the pedal body 16 from the rider. The load receiving part 32 can further include a support portion 62 that supports the load receiving contact portion 60. The support portion 62 can be attached to the body part 30. More specifically, the support portion 62 can attach the load receiving contact portion 60 to the body part 30 and thereafter support the load receiving contact portion 60 when the rider's load is applied. The load receiving part 32 can also include at least one fastener 64. The support portion 62 of the load receiving part 32 can be attached to the body part 30 by the at least one fastener 64. The load receiving part 32 can be attached to the body part 30 by the support portion 62 and the at least one support fastener 64, for example, by inserting the load receiving contact portion 60 into the first gap 42 at the crank end side 30b of the body part 30 and placing the support fasteners 64 through fastening apertures 62a of the support portion 62 to attach the support portion 62 to the body part 30 at the crank end side 30b. Once attached, the load receiving contact portion 60 is held in place between the body part 30 and the support portion 62 by the support fasteners 64.

Figure 2:
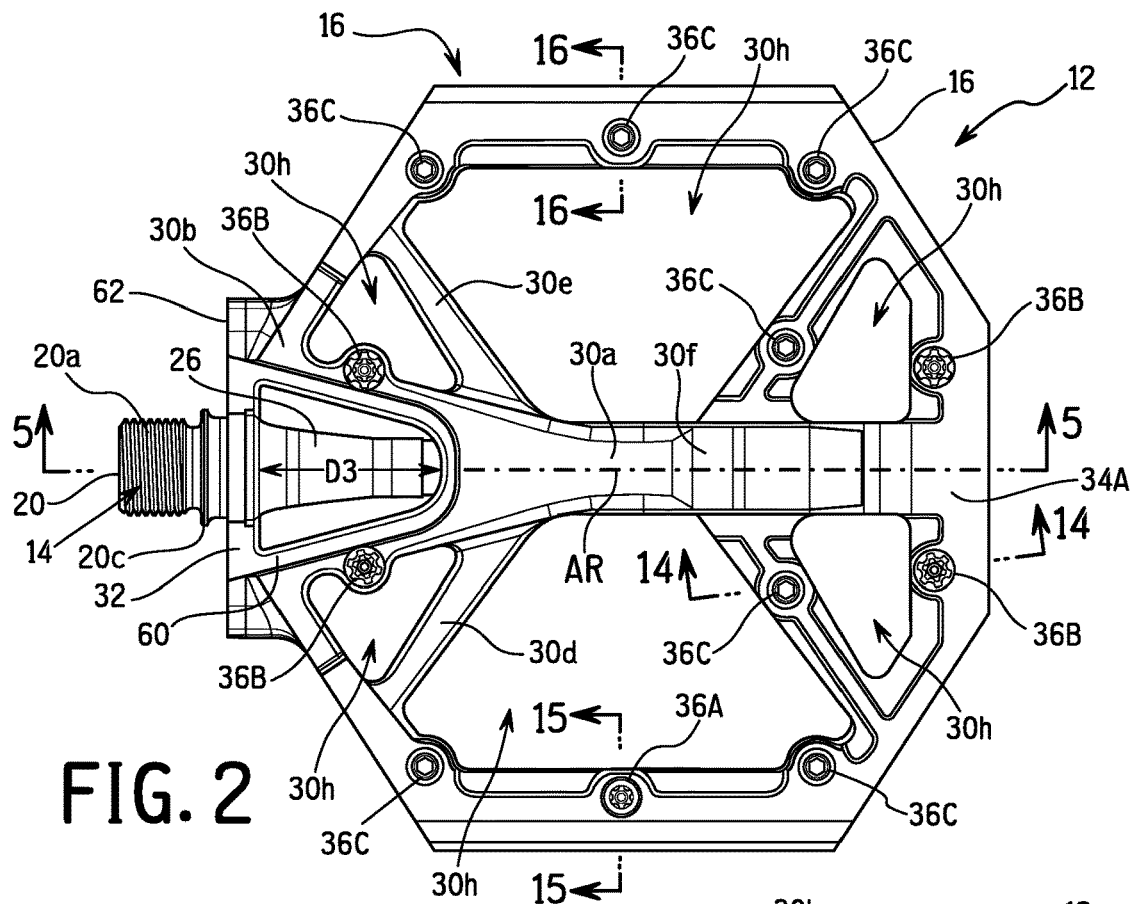
FIG. 2 is a top plan view of the bicycle pedal illustrated in FIG. 1.
Figure 3:
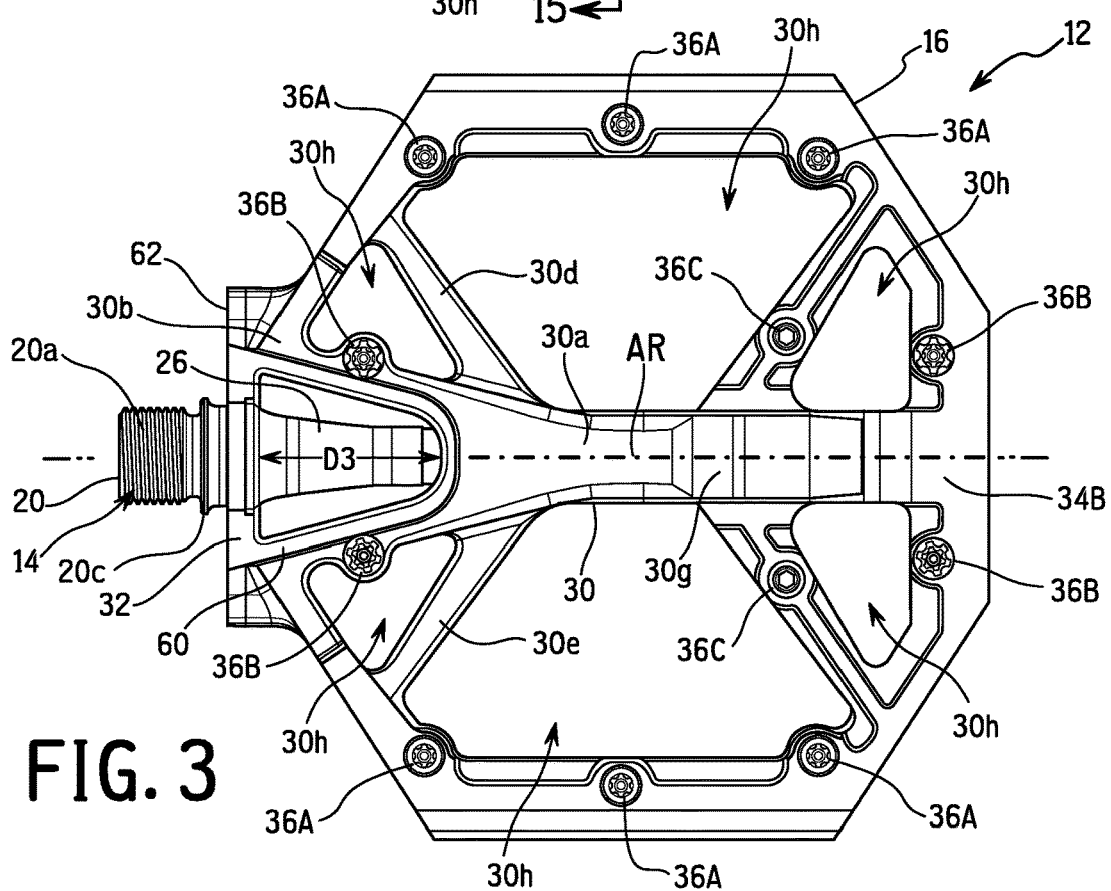
FIG. 3 is a bottom plan view of the bicycle pedal illustrated in FIG. 1.

As seen in FIG. 10, the load receiving part 32 can include a pedal shaft receiving aperture 60a that encircles the contact portion 24 of the pedal shaft 14. More specifically, the load receiving contact portion 60 can include the pedal shaft receiving aperture 60a. The load receiving contact portion 60 can also include an entrance aperture 60b and two side walls 60c which create an exposing aperture 60d in a direction perpendicular to the rotational center axis AR of the pedal shaft 14. The pedal shaft receiving aperture 60a encircles the contact portion 24 of the pedal shaft 14 around the rotational center axis AR when the pedal shaft 14 is fully inserted into the body part 30. The entrance aperture 60b encircles the pedal shaft 14 around the rotational center axis AR between the exposed portion 26 and the second end portion 22 when the pedal shaft 14 is fully inserted into the body part 30. As seen in FIG. 5, the entrance aperture 60*b* can also protrude into the entrance opening 40*a* of the pedal shaft receiving bore 40 when the load receiving part 32 is attached to the body part 30. The side walls 60*c* align with and abut corresponding side walls 42*a* of the first gap 42 at the crank end side 30*b* of the body part 30 when the load receiving part 32 is attached to the body part 30. The side walls 60*c* can further include one or more mating feature 60*e* configured to mate with a corresponding one or more mating feature 42*b* on the corresponding side wall 42*a* of the first gap 42. Here, the mating feature 60*e* is one or more indentation extending longitudinally along each side wall 60*c* between the pedal shaft receiving aperture 60*a* and the entrance aperture 60*b*, and the corresponding mating feature 42*b* is a protrusion extending longitudinally along each side wall 42*a* and configured to protrude into the mating feature 60*e*. The indent can be a slit through the side wall 60*c*. Alternatively, the mating feature 60*e* can include a protrusion, and the corresponding mating feature 42*b* can include an indentation. When fully installed as shown in FIGS. 1 to 3, the exposing aperture 60*d* in the load receiving part 60 forms a space which exposes the exposed portion 26 of the pedal shaft 14. Here, the exposed portion 26 of the pedal shaft 14 is exposed on both the first side 30*f* and the second side 30*g* of the body part 30. An axial position of the part that receives the pedal shaft 14 of the load receiving part 32 is, for example, near the lip 20*c*. In this embodiment, the part that receives the pedal shaft 14 of the load receiving part 32 is the pedal shaft receiving aperture 60*a*. For example, the axial position of the pedal shaft receiving aperture 60*a* is from the outer side surface of the lip 20*c* to ¼ of the axial length as seen in FIG. 9. The axial position of the pedal shaft receiving aperture 60*a* can be represented by a center position of the axial length of the pedal shaft receiving aperture 60*a*.

As seen in FIG. 10, the contact portion 24 of the pedal shaft 14 can be provided, for example, in an area A2 (see, FIGS. 9 and 10) from the outer side surface of the lip 20*c* to ¼ of the axial length of the pedal shaft 12. The axial position of the contact portion 24 can be represented by a center position of the axial length of the contact portion 24 of the pedal shaft 14. As seen in FIG. 10, the axial length of the pedal shaft 12 is from the outer side surface of the lip 20*c* in the axial direction to the tip of the second end portion 22. That is, the axial length of the pedal shaft 12 is the length of the pedal shaft 12 excluding the outer thread 20*a*.

As seen in FIG. 3, the load receiving part 32 is spaced axially from the entrance opening 40*a* of the pedal shaft receiving bore 40 along the rotational center axis AR of the pedal shaft 14. More specifically, the inner surface of the pedal shaft receiving aperture 60*a* of the load receiving part 32 which makes contact with the contact portion 24 of the pedal shaft 14 under a rider's load. The load receiving part 32 is spaced axially by a distance D3 from the entrance opening 40*a* of the pedal shaft receiving bore 40 along the rotational center axis AR of the pedal shaft 14. In FIGS. 2 and 3, this axial spacing distance D3 is shown across the exposing aperture 60*d* which exposes the exposed portion 26. In this way, the pedal shaft 14 has an exposed portion 26 that is disposed outside of the pedal body 16 between the load receiving part 32 and the entrance opening 40*a* of the pedal shaft receiving bore 40. By creating the exposing aperture 60*d* with the exposed portion 26 of the pedal shaft 14, the rider's load can be distributed away from the first sliding bearing 46A inside the pedal shaft receiving bore 40, and can instead be focused at the location where the contact portion 24 of the pedal shaft 14 contacts the load receiving part 32. For example, the load applied to the first sliding bearing 46A is larger than the load applied to the second sliding bearing 46B until the contact position 24 of the pedal shaft 14 contacts the load receiving part 32. However, when the contact position 24 of the pedal shaft 14 contacts the load receiving part 32, the load applied to the load receiving part 32 and the second sliding bearing 46B becomes larger than the load applied to the first sliding bearing 46A.

FIG. 5 shows a no load condition in which a rider is not pressing downwardly on the pedal body 16. Here, the load receiving part 32 is located at a position corresponding to the contact portion 24 of the pedal shaft 14 along the rotational center axis AR. More specifically, the inner surface of the pedal shaft receiving aperture 60*a* of the load receiving part 32 is located at a position corresponding to the contact portion 24 of the pedal shaft 14 along the rotational center axis AR. In this configuration, the load receiving part 32 is configured to receive a load from the contact portion 24 of the pedal shaft 14. The load receiving part 32 is configured to receive the load when a rider presses downwardly on the pedal body 16. Here, the load receiving part 32 is at least partly spaced from the contact portion 24 under the no load condition. More specifically, the inner surface of the pedal shaft receiving aperture 60*a* of the load receiving part 32 is at least partly spaced from the contact portion 24 under the no load condition. The load receiving part 32 is at least partly spaced from the contact portion 24 by a distance D4 under the no load condition. For example, the distance D4 can range from 0.2 mm to 0.8 mm. More suitably, the distance D4 can range from 0.3 mm to 0.6 mm. The distance D4 is taken in a direction perpendicular to the rotational center axis AR. The distance D4 can also exist under a predetermined load condition in which a load applied to the pedal body 16 does not exceed a predetermined value. When the distance D4 exists under the predetermined load condition, a first portion and a second portion support the pedal body 16 on the bicycle crank 18. The first portion is located at the first end portion 20 on the pedal shaft 14. The second portion is located within the pedal shaft receiving bore 40 proximal to the second end portion 22 on the pedal shaft 14. The predetermined load is a load in a case where the load receiving part 32 is not in contact with the contact portion 24 of the pedal shaft 14. For the predetermined load, the first portion receives a greater load than the second portion.

FIG. 6 shows a load being applied to the pedal body 16 by the rider. Here, the load receiving part 32 contacts the contact portion 24 upon a load applied to the pedal body 16 from a rider. At the location L1, the load receiving part 32 at the inner surface of the pedal shaft receiving aperture 60*a* contacts the contact portion 24 upon the load applied to the pedal body 16 from the rider. In doing so, the load receiving part 32 absorbs at least a portion of a force F applied to the pedal body in a direction perpendicular to the rotational center axis of the pedal shaft 14. For example, the direction perpendicular to the rotational center axis is a downward direction in FIG. 6. The force F can be due to a rider stepping onto the pedal body 16. For example, the force F can be greater than a pedaling force that is applied by the rider sitting on a saddle. For example, the force F can be the pedaling force that is applied by a rider standing from the saddle. The pedaling force applied by the rider sitting on the saddle can be less than the predetermined value under the predetermined load condition. That is, the pedal shaft 14 can contact the load receiving part 32 in a case where the force F exceeds a predetermined value while the rider is biking. The predetermined value is a force value that is greater than a certain value that occurs in a case where the rider is biking. The contact at the location L1 can be caused, for example, as the exposed portion 26 of the pedal shaft 14 bends slightly within the exposing aperture 60d under the force F from the rider. Thus, by exposing the exposed portion 26 as discussed herein, and by aligning the contact portion 24 with the inner surface of the pedal shaft receiving aperture 60a as shown, the load from the rider can be distributed to the load receiving part 32. A large force applied by the rider occurs, for example, in a case where a large force is applied from the outside of the bicycle. A large force applied from the outside of the bicycle is, for example, an impact force generated in a case of going down the stairs by the bicycle.

At least one of the load receiving contact portion 60 of the load receiving part 32 and the contact portion 24 of the pedal shaft 14 can include resin material. The resin material can be, for example, nylon or POM. The resin material can be advantageous because resin material does not easily wear due to contact with the pedal shaft 14, which can be a metal material such as carbon steel or chrome molybdenum steel. The support portion 62 can include a metallic material. The metallic material can add rigidity and strength to the load receiving part 32 and to hold the load receiving contact portion 60 in place when contact is made with the contact portion 24 of the pedal shaft 14.

FIGS. 7 and 8 show the attachment of the resin tread parts 34 to the body part 30. As illustrated, at least one resin tread part 34 can be attached to the body part 30 by at least one threaded fastener 36. Here, the at least one threaded fastener 36 includes a plurality of threaded fasteners 36. The at least one resin tread part 34 includes a first resin tread part 34A and a second resin tread part 34B. The first resin tread part 34A is attached to the first side 30f of the body part 30 by at least some of the plurality of threaded fasteners 36. The second resin tread part 34B is attached to the second side 30g of the body part 30 by at least some of the plurality of threaded fasteners 36. The resin tread parts 34 are advantageous, for example, because they improve the rider's grip on the bicycle pedal 12 and do not easily wear due to contact with the rider's shoe. By making the resin tread parts 34 removably attachable as shown, a rider is able to replace the resin tread parts 34 or interchangeably use different resin tread parts 34 as desired. The different resin tread parts 34 can be, for example, made of different materials or formed with different shapes or surface features.

As seen in FIGS. 7, 8 and 14 to 16, each threaded fastener 36 is configured to attach a resin tread part 34 to the body part 30. Here, at least one resin tread part 34 has a through-hole 66 through which a threaded fastener 36 can pass. More specifically, each resin tread part 34 has a plurality of through-holes 66 through which the threaded fasteners 36 can pass. The body part 30 further has a plurality of fixing holes 68 which align with the plurality of the through-holes 66 when the resin tread part 34 is placed against the body part 30. Some embodiments of the through-holes 66 of the resin tread part 34 can have a larger diameter than the corresponding fixing hole 68 of the body part 30 which aligns therewith. By inserting a fastener 36 through each of the through-holes 66 and into each of the fixing holes 68, the resin tread part 34 can be removably attached to the body part 30. The body part 30 can also include a plurality of fixing holes 69 that are not used to attach the resin tread part 34. The fixing hole 69 is provided adjacent to the side wall 42a. The fixing hole 69 is arranged laterally outside the first gap 42. The threaded fastener 36A, 36B with a spike portion 72A, 72B is attached to the fixing hole 69, for example.

To facilitate attachment of a resin tread part 34 to the body part 30, the resin tread parts 34 and the body part 30 have corresponding features which ensure proper alignment. For example, as seen in FIGS. 7, 8 and 14 to 16, each of the fixing holes 68 has an outer surface 68a which protrudes outwardly from the first side 30f or the second side 30g of the body part 30. This protrusion is configured to align with a corresponding indentation 66a surrounding a corresponding through-hole 66 of the resin tread part 34. However, this protrusion can be omitted. In the following description, the outer surface 68a, 168a is described as a projecting outer surface in order to easily distinguish it from other outer surfaces 34b, 66c, 166c. The protruding outer surface 68a has a top wall and side wall. The indentation 66a has a side wall and a bottom wall. The side wall of the indentation 66a contacts the side wall of the protruding outer surface 68a. The bottom wall of the indentation 66a contacts the top wall of the protruding outer surface 68a. That is, the indentation 66a is provided on the side of the tread portion 34 facing the body portion 30 in a case where the tread portion 34 is attached to the body portion 30. Additionally, as seen in FIG. 8, a mating surface 34a of each resin tread part 34 is indented with respect to an outer surface 34b and one or more surface protrusions 34c, thus enabling the first side 30f or second side 30g of the body part 30 to align with the indented mating surface 34a. Each resin tread part 34 also includes a portion 34d which fills the second gap 44 of the exit opening 40b when fully installed.

As seen in FIGS. 7 and 8, each resin tread part 34 is configured to at least partially cover the first side 30f or the second side 30g of the body part 30. Here, the first resin tread part 34A at least partially covers the first side portion 30d and the second side portion 30e on the first side 30f of the body part 30. Likewise, the second resin tread part 34B at least partially covers the first side portion 30d and the second side portion 30e on the second side 30g of the body part 30. However, the resin tread parts 34 do not cover the central portion 30a of the body part 30 in the illustrated embodiment, thus enabling the pedal body 16 to be formed as thin as possible with enough room in the central portion 30a to receive the pedal shaft 14.

As illustrated, the plurality of threaded fasteners 36 do not need to all be the same. The threaded fasteners 36 can include one or more first threaded fastener 36A, one or more second threaded fastener 36B, and one or more third threaded fastener 36C. By mixing or rearranging different types of threaded fasteners 36, a rider can customize the bicycle pedal 12 for the best shoe grip. In FIGS. 7 and 8, for example, a plurality of first threaded fasteners 36A, a plurality of second threaded fasteners 36B, and a plurality of third threaded fasteners 36C are used to attach each of the first resin tread part 34A and the second resin tread part 34B to the body part 30. Here, different fastener configurations are used on the first side 30f and second side 30g of the body part 30, thus enabling a rider to alternate between two different configurations by rotating the pedal body 16 to the opposite side. For example, in FIG. 2 the majority of the threaded fasteners 36 are third threaded fasteners 36C without spikes (7 of 12), whereas in FIG. 3 the majority of the threaded fasteners 36 are first threaded fasteners 36A with spikes (6 of 12) and second threaded fasteners with spikes (4 of 12), enabling the rider to alternate between a mostly spiked grip and a mostly non-spiked grip by rotating the pedal body 16.

Figure 14:
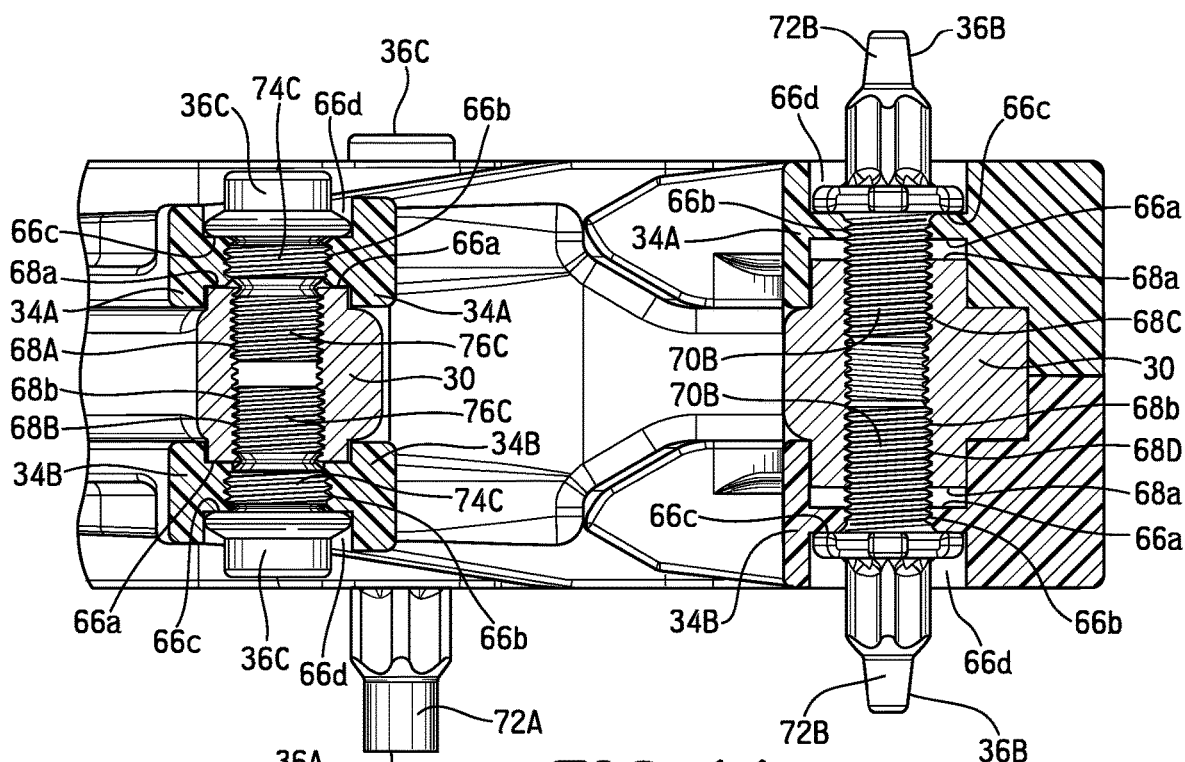
FIG. 14 is a cross-sectional view of the bicycle pedal illustrated in FIG. 1 taken from a section line 14-14 in FIG. 2.
Figures 15, 16:
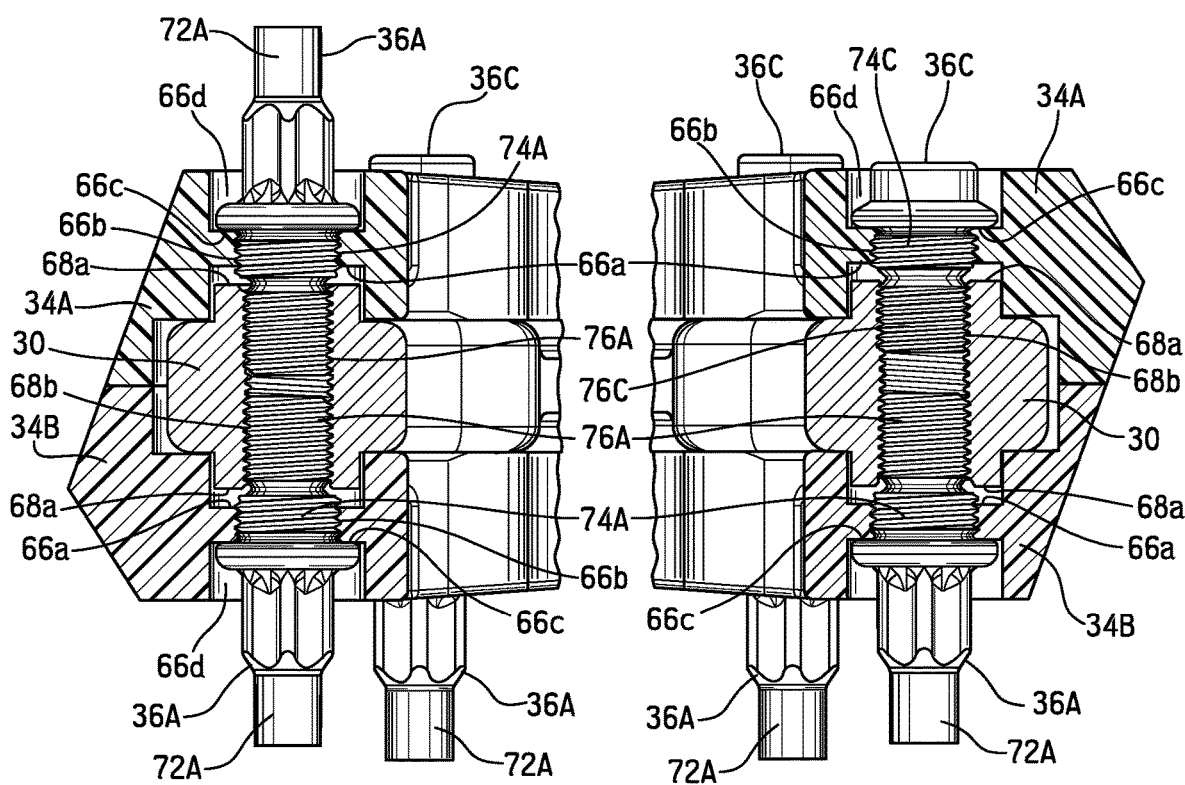
FIG. 15 is a cross-sectional view of the bicycle pedal illustrated in FIG. 1 taken from a section line 15-15 in FIG. 2.
FIG. 16 is a cross-sectional view of the bicycle pedal illustrated in FIG. 1 taken from a section line 16-16 in FIG. 2.
Figure 23:
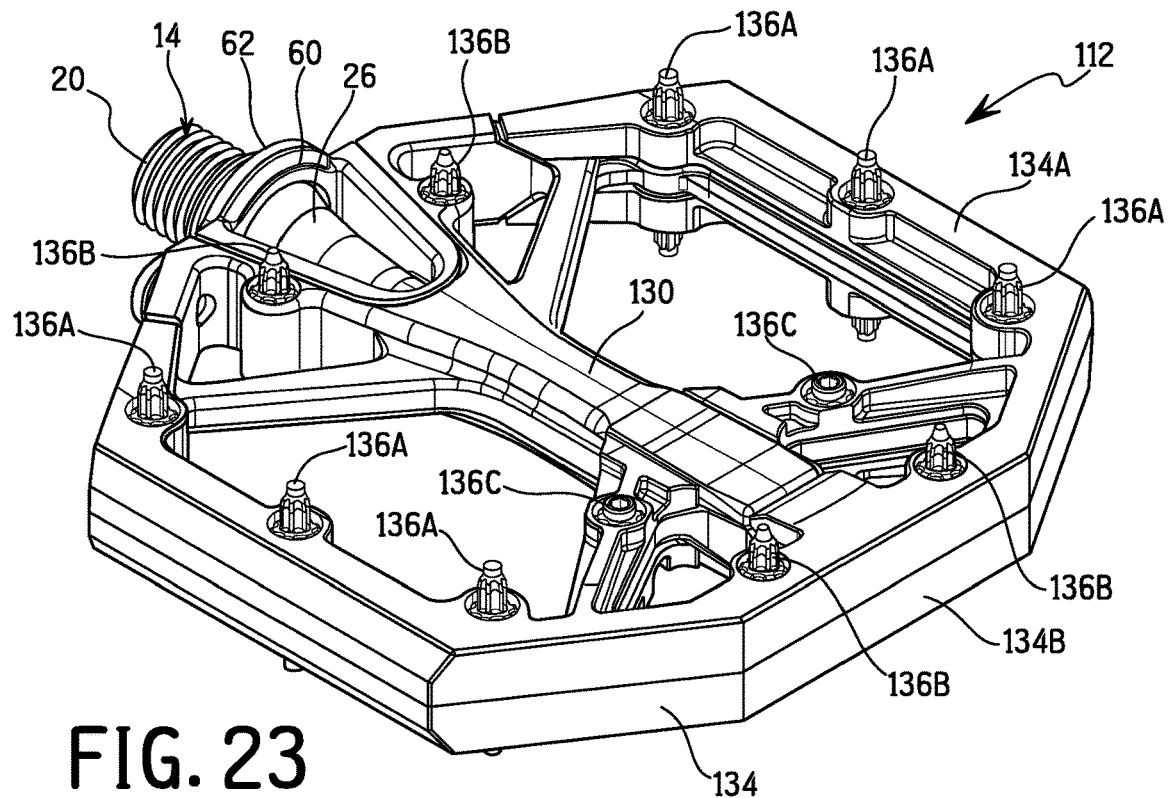
FIG. 23 is a top perspective view of a bicycle pedal in accordance with a second embodiment.
Figure 24:
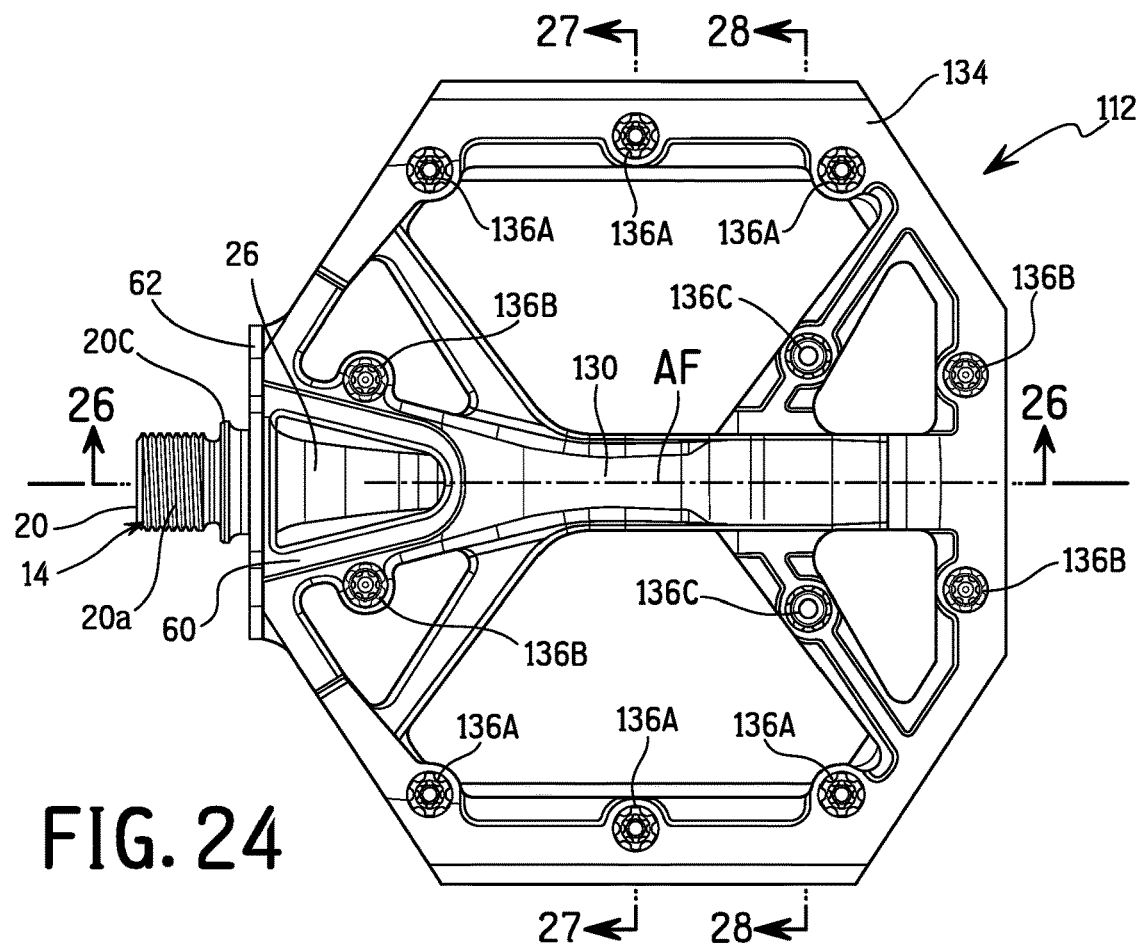
FIG. 24 is a top plan view of the bicycle pedal illustrated in FIG. 23.

As seen in FIGS. 14 to 16, the fixing holes 68 on opposite sides of the body part 30 can align with each other. In FIG. 14, for example, a first fixing hole 68A aligns with a second fixing hole 68B, and a third fixing hole 68C aligns with fourth fixing hole 68D. Thus, a first hole through the first side 30f and the second side 30g of the body part 30 includes the first fixing hole 68A and the second fixing hole 68B, and a second hole through the first side 30f and the second side 30g of the body part 30 includes the third fixing hole 68C and the fourth fixing hole 68D. Here, the fixing holes 68 on opposite sides of the body part 30 connect with each other (e.g., the fixing holes 68A and 68B form a continuous hole through the body part 30, and the fixing holes 68C and 68D form a continuous hole through the body part 30) and a threaded inner surface 68b extends continuously therethrough. However, the fixing holes 68 on opposite sides of the body part 30 do not have to connect, or can include separately spaced apart ones of the threaded inner surfaces 68b. By aligning the fixing holes 68 in this manner and using different types of threaded fasteners 36 on opposite sides of body part 30, the manufacturer or rider can customize each side of body part 30, for example, for use with a different type of shoe. When customized in this manner, the rider can rotate the bicycle pedal to accommodate whichever shoe is intended for that side.

FIGS. 17 and 18 show the first threaded fastener 36A in more detail. Here, the first threaded fastener 36A includes a threaded portion 70A and a spike portion 72A. The threaded portion 70A and the spike portion 72A are located on opposite ends of a fastener axis AF1. The threaded portion 70A is configured to screw into a fixing hole 68 in the body part 30. The spike portion 72A is configured to protrude in the opposite direction to grip the rider's shoe. This way, the first threaded fastener 36A achieves the dual purpose of attaching a resin tread part 34 to the body part 30 and providing a spike to grip the rider's shoe. Since the first threaded fasteners 36A are removably attached to the body part 30 via the threaded portion 70A, threaded fasteners 36 with different sizes or types of spike portions 72A can be moved or interchanged to suit the needs of the rider using the bicycle pedal 12 (e.g., the rider can modify the spike location and height as preferred).

The threaded portion 70A can further include a first threaded section 74A and a second threaded section 76A. The first threaded section 74A has a first diameter, and the second threaded section 76A has a second diameter. As seen in FIGS. 17 and 18, the first threaded section 74A has a larger diameter than the second threaded section 76A. That is, the second threaded section 76A has a second diameter that is smaller than the first diameter. The first threaded section 74A is configured to be provided in a hole formed in the bicycle pedal 12. The second threaded section 76A is configured to screw into the bicycle pedal 12. As seen in FIGS. 15 and 16, the first threaded section 74A is provided at the resin tread part 34, and the second threaded section 76A is screwed into the body part 30. Specifically, as seen in FIGS. 15 and 16, the first threaded section 74A locates within a through-hole 66 of the resin tread part 34, and the second threaded section 76A is screwed into a corresponding fixing hole 68 of the body part 30. Both the first threaded section 74A and the second threaded section 76A can include screw threads. At least one screw thread of the first threaded section 74A can contact a side wall 66b of the through-hole 66. At least one screw thread of the second threaded section 76A can screw into the fixing hole 68. Additionally, at least one screw thread of the first threaded section 74A can cut into the side wall 66b of the through-hole 66 to deform the resin material, and at least one screw thread of the second threaded section 76A can screw into a threaded inner surface 68b corresponding to a side wall of the fixing hole 68.

As seen in FIGS. 14 to 16, the spike portion 72A protrudes outwardly with respect to the resin tread part 34. More specifically, the spike portion 72A protrudes outwardly with respect to the resin tread part 34 when attached to the pedal body 16, such that the spike portion 72A helps grip the rider's shoe when the rider uses the bicycle pedal 12. The spike portion 72A can include a circumferential surface 78A and a top surface 80A. The circumferential surface 78A of the spike portion 72A can include a plurality of circumferential grooves or at least one spiral groove (not shown in FIGS. 17 and 18). In this way, the spike portion 72A can protrude into the treads in the rider's shoe and grip the surfaces of the treads. Here, the top surface 80A is shown as a flat surface, but the top surface 80A can also include other surfaces or grooves to assist in gripping the rider's shoe. Additionally, although the circumferential surface 78A is shown in FIGS. 17 and 18 as a forming a straight cylinder, the circumferential surface 78A can also be angled as shown for example by the second threaded fastener 36B shown in FIGS. 19 and 20.

The first threaded fastener 36A can include a head portion 82A having an abutment surface 84A that contacts an outer surface of the resin tread part 34. Thus, as seen in FIGS. 15 and 16, when the second threaded section 76A screws into the fixing hole 68 of the body part 30, the abutment surface 84A contacts the outer surface 66c surrounding the through-hole 66 and presses the resin tread part 34 into the body part 30 for secure attachment. The outer surface 66c has a side wall and a bottom wall. The bottom wall of the outer surface 66c contacts the abutment surface 84A of the head portion 82A. That is, the outer surface 66c is provided on the stepping surface side of the tread part 34 in a case where the tread part 34 is attached to the body part 30.

The first threaded fastener 36A can include an additional abutment surface 86A between the first threaded section 74A and the second threaded section 76A in a fastener direction with respect to a fastener axis AF1 of the first threaded fastener 36A. The additional abutment surface 86A contacts an outer surface of the body part 30. This limits the depth of the first threaded fastener 36A, placing the spike portion 72A at an appropriate height. When the second threaded section 76A screws into the fixing hole 68 of the body part 30, the additional abutment surface 86A can contact the protruding outer surface 68a surrounding the fixing hole 68 to limit the depth of the first threaded fastener 36A in the direction of the fastener axis AF1. The additional abutment surface 86A can contact the protruding outer surface 68a surrounding the fixing hole 68 to generate an axial force that fixes the first threaded fastener 36A to the body part 30. As described above, the protruding outer surface 68a has a top wall and side wall. The additional abutment surface 86A can contact the top wall of the protruding outer surface 68a.

The first threaded fastener 36A can include a tool-engagement portion 88A located between the spike portion 72A and the threaded portion 70A. The tool-engagement portion 88A can include a plurality of grooves 90A which extend parallel to the fastener axis AF1 of the first threaded fastener 36A. Thus, a tool can be fitted over the spike portion 72A and mated with the plurality of grooves 90A, enabling attachment or detachment of the first threaded fastener 36A by rotation of the tool. The tool-engagement portion 88A can have other shapes. The tool-engagement portion 88A can have a polygonal shape, such as a hexagonal shape.

FIGS. 15 and 16 show several first threaded fasteners 36A attaching a first resin tread part 34A and a second resin tread part 34B to a body part 30. To attach the resin tread part 34 to the body part 30, the resin tread part 34 is first placed against the body part 30 so that one or more through-holes 66 of the resin tread part 34 align with one or more fixing holes 68 of the body part 30. Then, the second threaded section 76A is screwed into the threaded inner surface 68b of the fixing hole 68 until the additional abutment surface 86A abuts the outer surface 68a of the body part 30 surrounding the fixing hole 68. At the same time, the first threaded section 74A can contact the side wall 66b of the through-hole 66. Optionally, the first threaded section 74A can cut into the side wall 66b of the through-hole 66 (e.g., by about 0.2 mm) and deform the resin for an attachment grip, thus restricting the first threaded fastener 36A from loosening. Here, the first threaded section 74A is dimensioned so that the abutment surface 84A contacts an outer surface 66c of the resin tread part 34 surrounding the through-hole 66. Thus, the first threaded section 74A is configured to be provided at a tread part 34 of the bicycle pedal 12, and the second threaded section 76A is configured to be screwed into the body part 30 of the bicycle pedal 12. Additionally, the spike portion 72A is configured to protrude outwardly with respect to the tread part 34. As seen in FIGS. 15 and 16, the spike portion 72A is configured to protrude outwardly from an indentation 66d surrounding the through-hole 66, thus hiding the head portion 82A within the indentation 66d so that only the spike portion 72A is contacted by the rider's shoe. In FIG. 15, the abutment surface 84A of the head portion 82A contacts the outer surface 66c. However, the additional abutment surface 86A does not contact the protruding outer surface 68a. The first threaded fastener 36A is tightened until the additional abutment surface 86A contacts the outer surface 66c. In that case, the abutment surface 84A is pressed against the outer surface 66c even after contacting the outer surface 66c. Thus, the outer surface 66c is deformed by the abutment surface 84A. This deformation can be within the range of elastic deformation of the outer surface 66c, for example.

FIGS. 19 and 20 show the second threaded fastener 36B in more detail. Here, the second threaded fastener 36B includes a threaded portion 70B and a spike portion 72B. The threaded portion 70B and the spike portion 72B are located on opposite ends of a fastener axis AF2. The threaded portion 70B is configured to screw into a fixing hole 68 in the body part 30. The spike portion 72B is configured to protrude in the opposite direction to grip the rider's shoe. This way, the second threaded fastener 36B achieves the dual purpose of attaching a resin tread part 34 to the body part 30 and providing a spike to grip the rider's shoe. Since the second threaded fasteners 36B are removably attached to the body part 30 via the threaded portion 70B, different threaded fasteners 36 with different sizes or types of spike portions 70B can be moved or interchanged to suit the needs of the rider using the bicycle pedal 12.

Here, the threaded portion 70B includes a single diameter. Thus, as seen in FIG. 14, the threaded portion 70B passes through both the through-hole 66 of the resin tread part 34 and the fixing hole 68 of the body part 30. At least one screw thread of the threaded portion 70B can contact the side wall 66b of the through-hole 66, and at least one screw thread of the threaded portion 70B can screw into the fixing hole 68. Additionally, at least one screw thread of the threaded portion 70B can cut into the side wall 66b of the through-hole 66 to deform the resin material, and at least one screw thread of the threaded portion 70B can screw into a threaded inner surface 68b corresponding to a side wall of the fixing hole 68. In an alternative embodiment, the threaded portion 70B can include multiple sections with different diameters, for example, as demonstrated by the first threaded section 74A and the second threaded section 76A of the first threaded fastener 36A discussed above.

As seen in FIG. 14, the spike portion 72B protrudes outwardly with respect to the resin tread part 34. More specifically, the spike portion 72B protrudes outwardly with respect to the resin tread part 34 when attached to the pedal body 16, such that the spike portion 72B helps grip the rider's shoe when the rider uses the bicycle pedal 12. The spike portion 72B can include a circumferential surface 78B and a top surface 80B. Here, the circumferential surface 78B includes angled sidewalls to form a conical shape. The circumferential surface 78B can also include a plurality of circumferential grooves or at least one spiral groove just like the circumferential surface 78A of the first threaded fastener 36A. In this way, the spike portion 72B can protrude into the treads in the rider's shoe and grip the surfaces of the treads. Here, the top surface 80B is shown as having rounded corners and a flat surface, but the top surface 80B can also include other surfaces or grooves to assist in gripping the rider's shoe.

The second threaded fastener 36B further includes a head portion 82B having an abutment surface 84B that contacts an outer surface of the resin tread part 34. Thus, as seen in FIG. 14, when the threaded portion 70B screws into the fixing hole 68 of the body part 30, the abutment surface 84B contacts the outer surface 66c surrounding the through-hole 66 and presses the resin tread part 34 into the body part 30 for secure attachment. Here, the head portion 82B further includes a plurality of indentations 85B around the perimeter thereof. The abutment surface 84B can contact the outer surface 66c surrounding the through-hole 66 to generate an axial force that fixes the second threaded fastener 36B to the body part 30.

The second threaded fastener 36B can further include a tool-engagement portion 88B located between the spike portion 72B and the threaded portion 70B. The tool-engagement portion 88B can include a plurality of grooves 90B which extend parallel to the fastener axis AF2 of the second threaded fastener 36B. Thus, a tool can be fitted over the spike portion 72B and mated with the plurality of grooves 90B, enabling attachment or detachment of the second threaded fastener 36B by rotation of the tool. Here, the head portion 82B further includes a plurality of indentations 85B around the perimeter thereof. The plurality of indentations 85B has the effect of reducing the weight of the fastener. In addition, the plurality of indentations 85B can have a function of a tool-engagement portion. The plurality of indentations 85B and the plurality of grooves 90B have a different profile with respect to each other. Here, the different profile includes at least one of different size and different shape. By having two tool-engagement portions, even if one tool-engagement portion breaks, another tool-engagement portion can be used.

FIG. 14 shows two second threaded fasteners 36B attaching a first resin tread part 34A and a second resin tread part 34B to a body part 30. To attach the resin tread part 34 to the body part 30, the resin tread part 34 is first placed against the body part 30 so that one or more through-holes 66 of the resin tread part 34 align with one or more fixing holes 68 of the body part 30. Then, the threaded portion 70B is screwed into the threaded inner surface 68b of the fixing hole 68 until the abutment surface 84B contacts an outer surface 66c of the resin tread part 34 surrounding the through-hole 66. As shown, the spike portion 72B is configured to protrude outwardly with respect to the tread part 34 when fully installed. As seen in FIG. 14, the spike portion 72B is configured to protrude outwardly from an indentation 66d surrounding the through-hole 66, thus hiding the head portion 82B within the indentation 66d so that only the spike portion 72B is contacted by the rider's shoe.

FIGS. 21 and 22 show the third threaded fastener 36C in more detail. Here, the third threaded fastener 36C includes a threaded portion 70C and a tool-engagement portion 88C located on opposite ends of a fastener axis AF3. The threaded portion 70C is configured to screw into a fixing hole 68 in the body part 30. The tool-engagement portion 88C has a short height without a spike portion as included by the first threaded fastener 36A and second threaded fastener 36B. By using a tool-engagement portion 88C without a spike portion, the third threaded fastener 36C can be interchanged with the first threaded fastener 36A or second threaded fastener 36B to enable a rider to remove a spike from a location on the bicycle pedal 12 while still keeping the resin tread part 34 attached to the body part 30 at that location. As seen in FIG. 16, the height of the tool-engagement portion 88C of the third threaded fastener 36C allows most or all of the tool-engagement portion 88C to be located within the indentation 66d surrounding the through-hole 66 of the resin tread part 34, thus restricting the third threaded fastener 36C from interfering with the rider's shoe. Here, the tool-engagement portion 88C includes a top hexagonal indentation to receive a corresponding tool, but other tool engagement surfaces are also possible.

The threaded portion 70C can further include a first threaded section 74C and a second threaded section 76C. As seen in FIGS. 21 and 22, the first threaded section 74C has a larger diameter than the second threaded section 76C. When the third threaded fastener 36C attaches a resin tread part 34 to the body part 30, the first threaded section 74C is provided at the resin tread part 64, and the second threaded section 76C is screwed into the body part 30. Specifically, as seen in FIG. 16, the first threaded section 74C locates within a through-hole 66 of the resin tread part 34, and the second threaded section 76C is screwed into a corresponding fixing hole 68 of the body part 30. Both the first threaded section 74C and the second threaded section 76C can include screw threads. At least one screw thread of the first threaded section 74C can contact the side wall 66b of the through-hole 66, and at least one screw thread of the second threaded section 76C can screw into the fixing hole 68. Additionally, at least one screw thread of the first threaded section 74C can cut into the side wall 66b of the through-hole 66 to deform the resin material, and at least one screw thread of the second threaded section 76C can screw into a threaded inner surface 68b corresponding to a side wall of the fixing hole 68.

The third threaded fastener 36C further includes a head portion 82C having an abutment surface 84C that contacts an outer surface of the resin tread part 34. Thus, as seen in FIG. 16, when the second threaded section 76C screws into the fixing hole 68 of the body part 30, the abutment surface 84C contacts the outer surface 66c surrounding the through-hole 66 and presses the resin tread part 34 into the body part 30 for secure attachment.

The third threaded fastener 36C further includes an additional abutment surface 86C between the first threaded section 74C and the second threaded section 76C in a fastener direction with respect to a fastener axis AF3. The additional abutment surface 86C contacts an outer surface of the body part 30, which limits the depth of the third threaded fastener 36C. When the second threaded section 76C screws into the fixing hole 68 of the body part 30, the additional abutment surface 86C contacts the protruding outer surface 68a surrounding the fixing hole 68 to limit the depth of the third threaded fastener 36C in the direction of the fastener axis AF3. The additional abutment surface 86C can contact the protruding outer surface 68a surrounding the fixing hole 68 to generate an axial force that fixes the first threaded fastener 36C to the body part 30.

FIG. 16 show a third threaded fastener 36C attaching a first resin tread part 34A to a body part 30. To attach the resin tread part 34 to the body part 30, the resin tread part 34 is first placed against the body part 30 so that one or more through-holes 66 of the resin tread part 34 align with one or more fixing holes 68 of the body part 30. Then, the second threaded section 76C is screwed into the threaded inner surface 68b of the fixing hole 68 until the additional abutment surface 86C abuts the outer surface 68a of the body part 30 surrounding the fixing hole 68. At the same time, the first threaded section 74C can contact the side wall 66b of the through-hole 66. Optionally, the first threaded section 74C can cut into the side wall 66b of the through-hole 66 (e.g., by about 0.2 mm) and deform the resin for an attachment grip, thus restricting the third threaded fastener 36C from loosening. Here, the first threaded section 74C is dimensioned so that the abutment surface 84C contacts an outer surface 66c of the resin tread part 34 surrounding the through-hole 66. Thus, the first threaded section 74C is configured to be provided at a tread part 34 of the bicycle pedal 12, and the second threaded section 76C is configured to be screwed into the body part of the bicycle pedal 12. In FIGS. 14 and 16, the abutment surface 84C of the head portion 82C contacts the outer surface 66c. However, the additional abutment surface 86C does not contact the protruding outer surface 68a. The first threaded fastener 36C is tightened until the additional abutment surface 86C contacts the outer surface 66c. In that case, the abutment surface 84C is pressed against the outer surface 66c even after contacting the outer surface 66c. Thus, the outer surface 66c is deformed by the abutment surface 84C. This deformation can be within the range of elastic deformation of the outer surface 66c, for example.

The first threaded fastener 36A and second threaded fastener 36B discussed herein can also be referred to as "spike pins" for a bicycle pedal 12. Thus, for example, a spike pin for a bicycle pedal 12 can comprise a spike portion 72A, 72B, a threaded portion 70A, 70B, and a tool-engagement portion 88A, 88B. The spike portion 72A, 72B can be configured to protrude outwardly with respect to a tread part 34 of the bicycle pedal 12. The threaded portion 70A, 70B can be configured to screw into the bicycle pedal 12. The tool-engagement portion 88A, 88B can be located between the spike portion 72A, 72B and the threaded portion 70A, 70B. The rest of the features discussed above can also be included in the spike pin and descriptions are omitted for brevity.

Referring now to FIGS. 23 to 28, a bicycle pedal 112 in accordance with a second embodiment will be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The main difference between the bicycle pedal 112 of FIGS. 23 to 28 and the bicycle pedal 12 of FIGS. 1 to 16 is that the bicycle pedal 112 uses an alternative body part 130, resin tread parts 134, and threaded fasteners 136. It should be understood by those of ordinary skill in the art from this disclosure that any of the features of bicycle pedal 112 can be added to the bicycle pedal 12 of the first embodiment, and vice versa.

The body part 130 includes fixing holes 168 which differ in geometry from the fixing holes 68 of the body part 30. Like the previous embodiment, the protruding outer surfaces 168a of the fixing holes 168 can protrude outwardly from the first side 30f or second side 30g of the body part 130. The protruding outer surfaces 168a has a side wall and a top wall. Here, however, the side wall of the protruding outer surface 168a of the fixing hole 168 is angled inwardly in a direction away from the body part 130 to create a conical shape. The body part 130 can also include fixing holes 169 that are not used to attach the resin tread part 134. The threaded fastener 136A, 136B with a spike portion 172A, 172B is attached to the fixing hole 169, for example.

Figure 27:
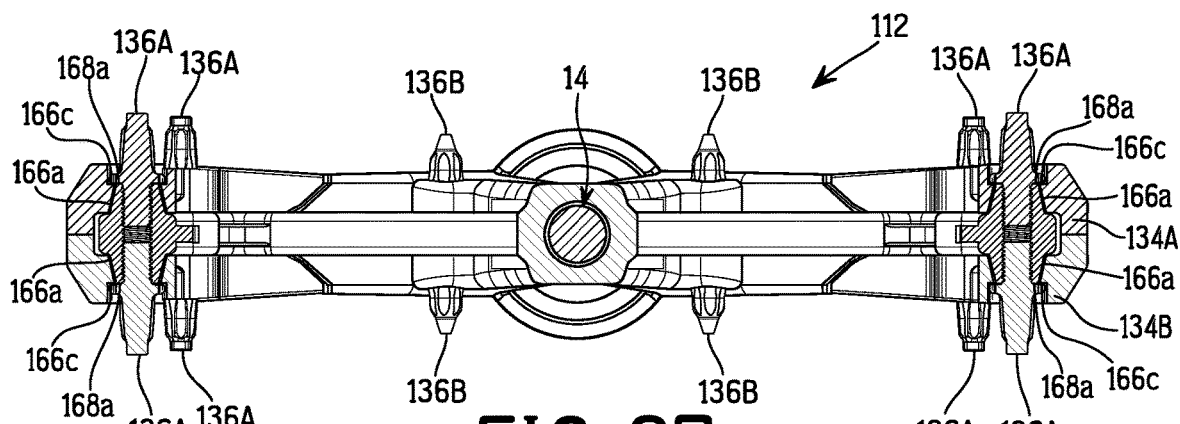
FIG. 27 is a cross-sectional view of the bicycle pedal illustrated in FIG. 23 taken from a section line 27-27 in FIG. 24.

Likewise, the resin tread part 134 includes a plurality of through-holes 166 which differ from the through-holes 66 of the resin tread part 34. Like the indentation 66a, an indentation 166a also has a side wall. Like the protruding outer surface 68a, a protruding outer surface 168a also has a side wall and top wall. As seen in FIG. 27, each through-hole 166 has the side wall of an indentation 166a which is angled to substantially match the angle of the side wall of a protruding outer surface 168a of a corresponding fixing hole 168. Thus, the bicycle pedal 112 differs from the bicycle pedal 12 in how the resin tread part 134 aligns with the body part 130.

Figure 25:
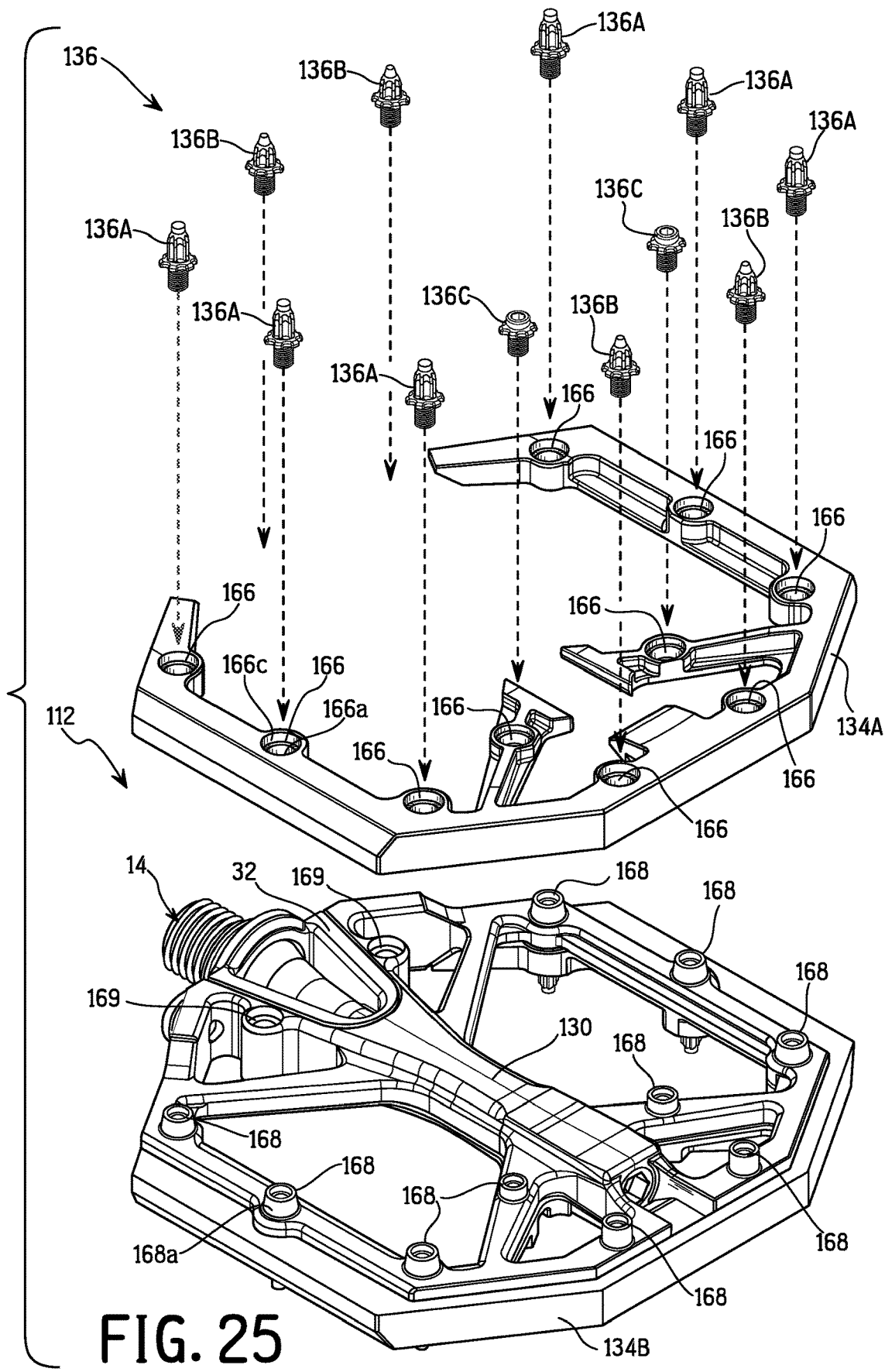
FIG. 25 is an exploded top perspective view of the top of the bicycle pedal illustrated in FIG. 23.

FIG. 25 shows the attachment of the resin tread parts 134 to the body part 130. As illustrated, the resin tread parts 134 are attached to the body part 130 by the at least one threaded fastener 136. Here, the at least one threaded fastener 136 includes a plurality of the threaded fasteners 136, and the at least one resin tread part 134 includes a first resin tread part 134A and a second resin tread part 134B.

As illustrated, the threaded fasteners 136 do not need to all be the same. The threaded fasteners 136 can include one or more first threaded fastener 136A, one or more second threaded fastener 136B, or one or more third threaded fastener 136C. As discussed above, by mixing or rearranging different types of threaded fasteners 136, a rider can customize the bicycle pedal 112 for the best shoe grip.

Figure 29:
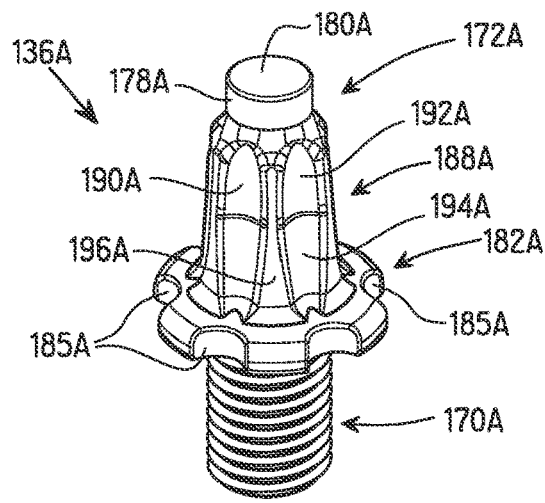
FIG. 29 is top perspective view of a fastener for the bicycle pedal of FIG. 23 in accordance with a first embodiment.
Figure 30:
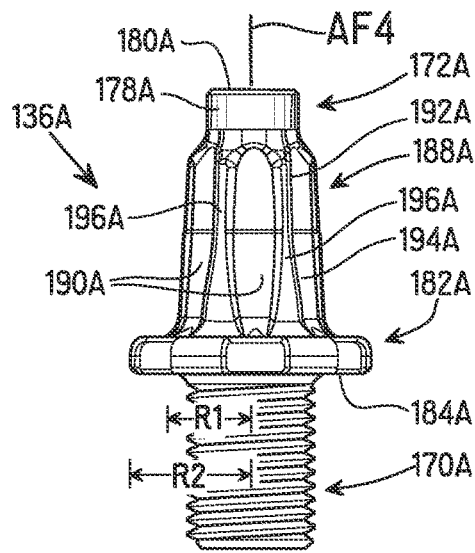
FIG. 30 is a side elevational view of the fastener of FIG. 29.

FIGS. 29 and 30 show the first threaded fastener 136A in more detail. Here, the first threaded fastener 136A includes a threaded portion 170A and a spike portion 172A. The threaded portion 170A and the spike portion 172A are located on opposite ends of a fastener axis AF4. The threaded portion 170A is configured to screw into a fixing hole 168 in the body part 130. The spike portion 172A is configured to protrude in the opposite direction to grip the rider's shoe. This way, the first threaded fastener 136A achieves the dual purpose of attaching a resin tread part 134 to the body part 130 and providing a spike to grip the rider's shoe.

Figure 26:
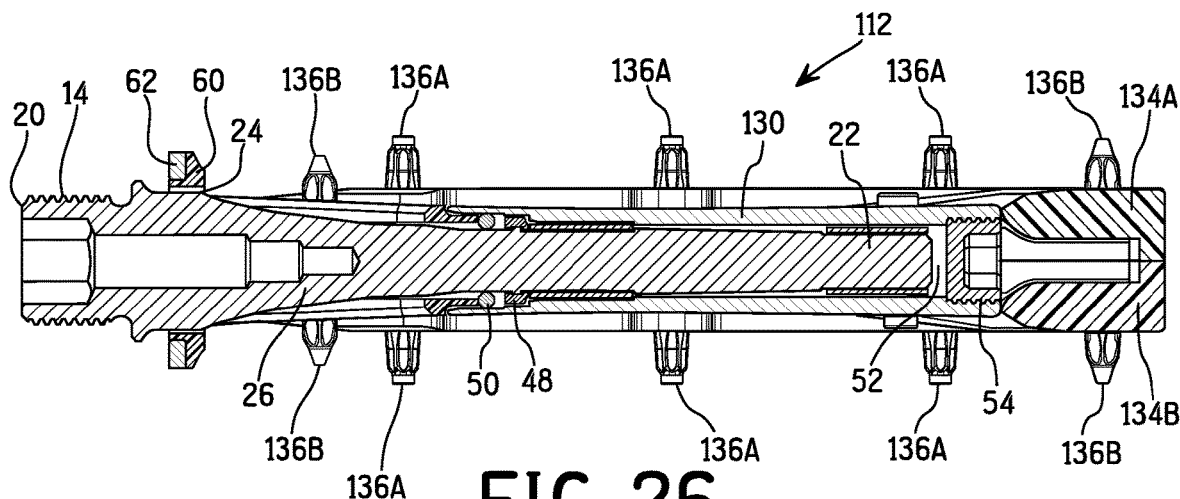
FIG. 26 is a side cross-sectional view, taken from a section line 26-26 in FIG. 24, showing the bicycle pedal illustrated in FIG. 23 in a no load condition.
Figure 28:
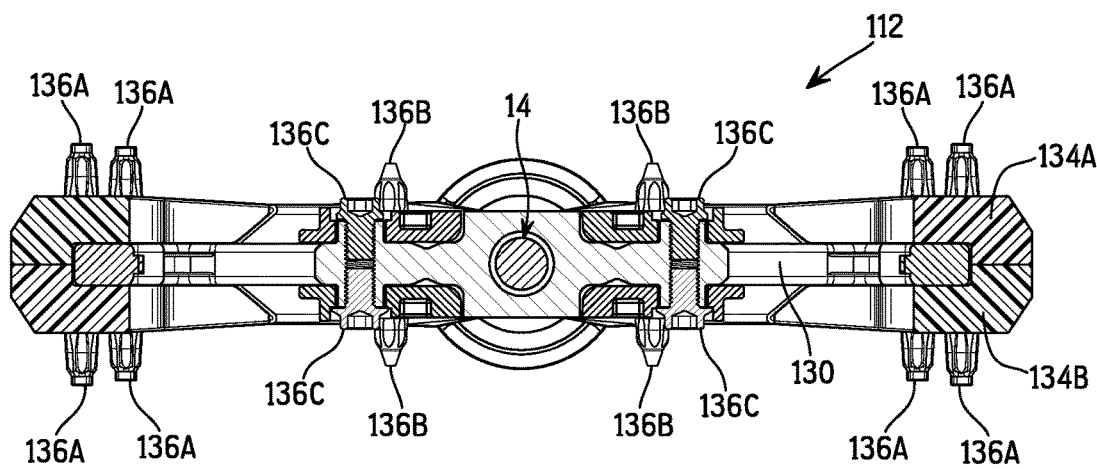
FIG. 28 is a cross-sectional view of the bicycle pedal illustrated in FIG. 23 taken from a section line 28-28 in FIG. 24.

As seen in FIGS. 26 to 28, the spike portion 172A is configured to protrude outwardly with respect to the resin tread part 134, such that the spike portion 172A helps grip the rider's shoe when the rider uses the bicycle pedal 112. The spike portion 172A can include a circumferential surface 178A and a top surface 180A. The circumferential surface 178A of the spike portion 172A can include a plurality of circumferential grooves or at least one spiral groove (not shown in FIGS. 29 and 30). In this way, the spike portion 172A can protrude into the treads in the rider's shoe and grip the surfaces of the treads. Here, the top surface 180A is shown as a flat surface, but the top surface 180A can also include other surface or grooves to assist in gripping the rider's shoe. Additionally, although the circumferential surface 178A is shown in FIGS. 29 and 30 as a forming a straight cylinder, the circumferential surface 178A can also be angled as shown for example by the second threaded fastener 136B shown in FIGS. 31 and 32.

The first threaded fastener 136A can further include a head portion 182A having an abutment surface 184A that contacts the outer surfaces 166c, 168a of the body part 130 and the resin tread part 134. The abutment surface 184A contacts a bottom wall of the outer surface 166c. The abutment surface 184A contacts a top wall of the protruding outer surface 168a. Similar to the first embodiment, the abutment surface 184A first contacts the outer surface 166c. The abutment surface 184A then deforms the outer surface 166c. Thereafter, abutment surface 184A contacts protruding outer surface 168a. Here, the head portion 182A includes a plurality of indentations 185A, such that the head portion 182A has a smaller inner radius R1 which extends from the fastener axis AF4 to the center of the indentations 185A, and a larger outer radius R2 which extends from the fastener axis AF4 to the perimeter of the head portion 182A between the indentations 185A. As seen in FIG. 27, when attaching a resin tread part 134 to a body part 130, this configuration allows the portion of the abutment surface 184A within the smaller inner radius R1 to contact the protruding outer surface 168a of the body part 130 surrounding the fixing hole 168, while the portion of the abutment surface 184A between the smaller inner radius R1 and the larger outer radius R2 contacts the surface of the resin tread part 134 surrounding the through-hole 166, thus pressing the resin tread part 134 into the body part 130. The portion of the abutment surface 184A within the smaller inner radius R1 can generate an axial force that fixes the first threaded fastener 136A to the body part 130. The portion of the abutment surface 184A between the smaller inner radius R1 and the larger outer radius R2 presses the resin tread part 134 into the body part 130 for secure attachment.

The first threaded fastener 136A can further include a tool-engagement portion 188A located between the spike portion 172A and the threaded portion 170A. The tool-engagement portion 188A can include a plurality of grooves 190A which extend parallel to the fastener axis AF4 of the first threaded fastener 136A. Thus, a tool can be fitted over the spike portion 172A and mated with the plurality of grooves 190A, enabling attachment or detachment of the first threaded fastener 136A by rotation of the tool.

Here, the tool-engagement portion 188A includes a first tool-engagement portion 192A and a second tool-engagement portion 194A arranged in a fastener axial direction with respect to a fastener axis AF4 of the first threaded fastener 136A. As shown in FIGS. 29 and 30, the first tool-engagement portion 192A and the second tool-engagement portion 194A have a different profile with respect to each other. Here, the profiles are different in shape and size. For example, the plurality of grooves 190A differ in shape and thickness within the first tool-engagement portion 192A in comparison to the second tool-engagement portion 194A, with the protrusions 196A surrounding the grooves 190A having an increased thickness and triangular shape at the second tool-engagement portion 194A. By using a first tool-engagement portion 192A and a second tool-engagement portion 194A having different profiles in this manner, multiple different types of tools can be used to remove the first threaded fastener 136A from the body part 130, which can be advantageous if one of the sections of the groove 190A or protrusions 196A breaks during installation or use.

The multiple different types of tools include both the same type of tools that differ in size and different types of tools.

Figure 31:
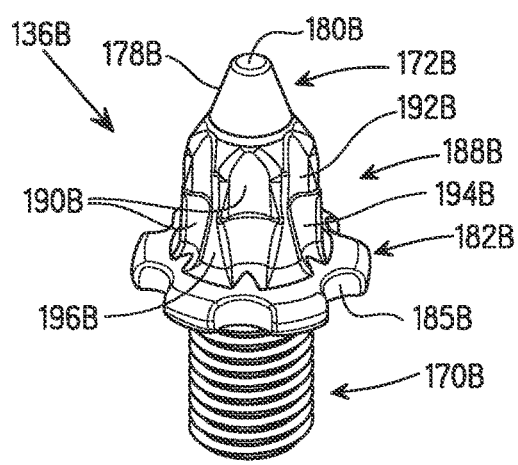
FIG. 31 is top perspective view of a fastener for the bicycle pedal of FIG. 23 in accordance with a second embodiment.

FIGS. 30 and 31 show the second threaded fastener 136B in more detail. Here, the second threaded fastener 136B includes a threaded portion 170B and a spike portion 172B. The threaded portion 170B and the spike portion 172B are located on opposite ends of a fastener axis AF5. The threaded portion 170B is configured to screw into a fixing hole 168 in the body part 130. The spike portion 172B is configured to protrude in the opposite direction to grip the rider's shoe. This way, the second threaded fastener 136B achieves the dual purpose of attaching a resin tread part 134 to the body part 130 and providing a spike to grip the rider's shoe.

As seen in FIGS. 26 to 28, the spike portion 172B is configured to protrude outwardly with respect to the resin tread part 134, such that the spike portion 172B helps grip the rider's shoe when the rider uses the bicycle pedal 112. The spike portion 172B can include a circumferential surface 178B and a top surface 180B. Here, the circumferential surface 178B includes angled sidewalls to form a conical shape. The circumferential surface 178B of the spike portion 172B can also include a plurality of circumferential grooves or at least one spiral groove (not shown in FIGS. 31 and 32). In this way, the spike portion 172B can protrude into the treads in the rider's shoe and grip the surfaces of the treads. Here, the top surface 180B is shown as having rounded corners and a flat surface, but the top surface 180B can also include other surfaces or grooves to assist in gripping the rider's shoe.

The second threaded fastener 136B can further include a head portion 182B having an abutment surface 184B that contacts the outer surfaces 166c, 168a of the body part 130 and the resin tread part 134. The abutment surface 184B contacts a bottom wall of the outer surface 166c. The abutment surface 184B contacts a top wall of the protruding outer surface 168a. Similar to the first embodiment, the abutment surface 184B first contacts the outer surface 166c. The abutment surface 184B then deforms the outer surface 166c. Thereafter, the abutment surface 184B contacts protruding outer surface 168a. Here, the head portion 182B includes a plurality of indentations 185B, such that the head portion 182B has a smaller inner radius R3 which extends from the fastener axis AF5 to the center of the indentations 185B, and a larger outer radius R4 which extends from the fastener axis AF5 to the perimeter of the head portion 182B between the indentations 185B. When attaching a resin tread part 134 to a body part 130, this configuration allows the portion of the abutment surface 184B within the smaller inner radius R3 to contact the protruding outer surface 168a of the body part 130 surrounding the fixing hole 168, while the portion of the abutment surface 184B between the smaller inner radius R3 and the larger outer radius R4 contacts the surface of the resin tread part 134 surrounding the through-hole 166, thus pressing the resin tread part 134 into the body part 130. The portion of the abutment surface 184B within the smaller inner radius R3 can generate an axial force that fixes the second threaded fastener 136B to the body part 130. The portion of the abutment surface 184B between the smaller inner radius R3 and the larger outer radius R4 presses the resin tread part 134 into the body part 130 for secure attachment.

The second threaded fastener 136B can further include a tool-engagement portion 188B located between the spike portion 172B and the threaded portion 170B. The tool-engagement portion 188B can include a plurality of grooves 190B which extend parallel to the fastener axis AF5 of the second threaded fastener 136B. Thus, a tool can be fitted over the spike portion 172B and mated with the plurality of grooves 190B, enabling attachment or detachment of the second threaded fastener 136B by rotation of the tool.

Figure 32:
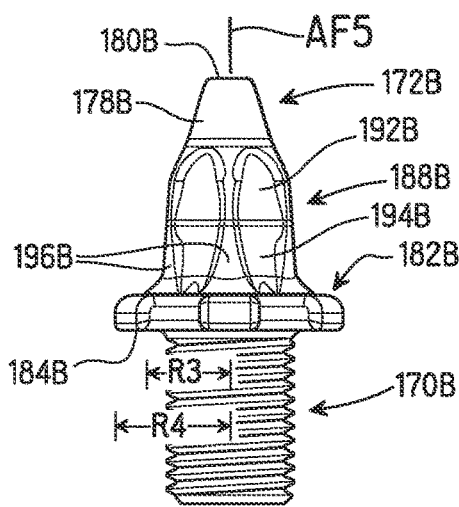
FIG. 32 is a side elevational view of the fastener of FIG. 31.

Here, the tool-engagement portion 188B includes a first tool-engagement portion 192B and a second tool-engagement portion 194B arranged in a fastener axial direction with respect to a fastener axis AF5 of the second threaded fastener 136B. As shown in FIGS. 31 and 32, the first tool-engagement portion 192B and the second tool-engagement portion 194B have a different profile with respect to each other. Here, the profiles are different in shape and size. For example, the plurality of grooves 190B differ in shape and thickness within the first tool-engagement portion 192B in comparison to the second tool-engagement portion 194B, with the protrusions 196B surrounding the grooves 190B having an increased thickness and triangular shape at the second tool-engagement portion 194B. By using a first tool-engagement portion 192B and a second tool-engagement portion 194B having different profiles in this manner, multiple different types of tools can be used to remove the second threaded fastener 136B from the body part 130, which can be advantageous if one of the sections of the groove 190B or protrusions 196B break during installation or use.

Figure 33:
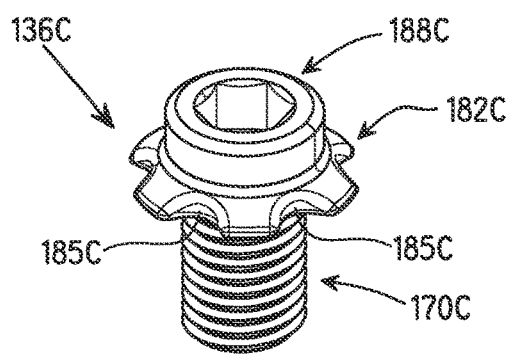
FIG. 33 is top perspective view of a fastener for the bicycle pedal of FIG. 23 in accordance with a third embodiment.
Figure 34:
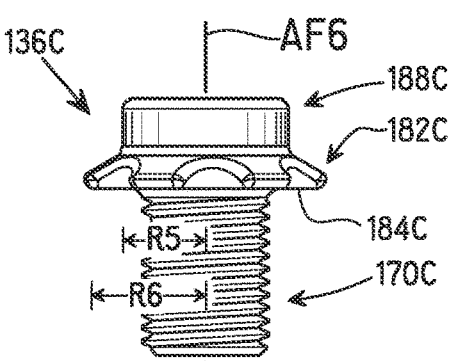
FIG. 34 is a side elevational view of the fastener of FIG. 33.

FIGS. 33 and 34 show the third threaded fastener 136C in more detail. Here, the third threaded fastener 136C includes a threaded portion 170C and a tool-engagement portion 188C. The threaded portion 170C and the tool-engagement portion 188C are located on opposite ends of a fastener axis AF6. The threaded portion 170C is configured to screw into a fixing hole 168 in the body part 130. The tool-engagement portion 188C has a short height without a spike portion as included by the first threaded fastener 136A and second threaded fastener 136B. By using a tool-engagement portion 188C without a spike portion, the third threaded fastener 136C can be interchanged with the first threaded fastener 136A or the second threaded fastener 136B to enable a rider to remove a spike from a location on the bicycle pedal 112 while still keeping the resin tread part 134 attached to the body part 130 at that location. As seen in FIG. 28, the height of the tool-engagement portion 188C of the third threaded fastener 136C allows most or all of the tool-engagement portion 188C to be located within an indentation surrounding the through-hole 166 of the resin tread part 134, thus restricting the third threaded fastener 136C from interfering with the rider's shoe. Here, the tool-engagement portion 188C includes a top hexagonal indentation to receive a corresponding tool, but other tool engagement surfaces are also possible.

The third threaded fastener 136C can further include a head portion 182C having an abutment surface 184C that contacts the outer surfaces 166c, 168a of the body part 130 and the resin tread part 134. The abutment surface 184C contacts a bottom wall of the outer surface 166c. The abutment surface 184C contacts a top wall of the protruding outer surface 168a. Similar to the first embodiment, the abutment surface 184C first contacts the outer surface 166c. The abutment surface 184C then deforms the outer surface 166c. Thereafter, abutment surface 184C contacts protruding outer surface 168a. Here, the head portion 182C includes a plurality of indentations 185C, such that the head portion 182C has a smaller inner radius R5 which extends from the fastener axis AF6 to the center of the indentations 185C, and a larger outer radius R6 which extends from the fastener axis AF6 to the perimeter of the head portion 182C between the indentations 185C. When attaching a resin tread part 134 to a body part 130, this configuration allows the portion of the abutment surface 184C within the smaller inner radius R5 to contact the protruding outer surface 168a of the body part 130 surrounding the fixing hole 168, while the portion of the abutment surface 184C between the smaller inner radius R5 and the larger outer radius R6 contacts the surface of the resin tread part 134 surrounding the through-hole 166, thus pressing the resin tread part 134 into the body part 130. The portion of the abutment surface 184C within the smaller inner radius R5 can generate an axial force that fixes the first threaded fastener 136C to the body part 130. The portion of the abutment surface 184C between the smaller inner radius R5 and the larger outer radius R6 presses the resin tread part 134 into the body part 130 for secure attachment.

The first threaded fastener 136A and second threaded fastener 136B discussed herein can also be referred to as "spike pins" for a bicycle pedal 12. Thus, for example, a spike pin for a bicycle pedal 112 can comprise a spike portion 172A, 172B, a threaded portion 170A, 170B, and a tool-engagement portion 188A, 188B. The spike portion 172A, 172B can be configured to protrude outwardly with respect to a tread part 134 of the bicycle pedal 112. The threaded portion 170A, 170B can be configured to screw into the bicycle pedal 112. The tool-engagement portion 188A, 188B can be located between the spike portion 172A, 172B and the threaded portion 170A, 170B. The tool-engagement portion 188A, 188B can include a first tool-engagement portion 192A, 192B and a second tool-engagement portion 194A, 194B arranged in a spike pin axial direction with respect to a spike pin axis of the spike pin. The first tool-engagement portion 192A, 192B and the second tool-engagement portion 194A, 194B have a different profile with respect to each other. Here, the different profile includes at least one of different size and different shape. By having two tool-engagement portions, even if one tool-engagement portion breaks, another tool-engagement portion can be used. The rest of the features discussed above can also be included in the spike pin and descriptions are omitted for brevity. The shape of screws that secure the pedal shaft 14 to the bicycle crank 18 are specified by ISO standards. In this embodiment, the screw that secure the pedal shaft 14 to the bicycle crank 18 is the outer thread 20a. Also, the lip 20c of the pedal shaft 14 generally has a same diameter for compatibility. For example, the thickness of the thin bicycle pedal 12, 112 is smaller than the diameter of the lip 20c of the pedal shaft 14. In this embodiment, the diameter of the lip 20c can be 18 mm. The pedal shaft diameter of the bearing portion is, for example, equal to or larger than 6.5 mm. The pedal shaft diameter of the bearing portion is more preferably equal to or larger than 6.7 mm, for example. The pedal shaft diameter of the bearing portion is, for example, equal to or smaller than 13 mm. If the pedal shaft diameter of the bearing portion is smaller than 8 mm without the load receiving part 32, the pedal shaft 14 may be broken. The stress concentration on the pedal shaft 14 is likely to occur at a portion where the shaft diameter changes between short axial lengths. In other words, the stress concentration is likely to occur where a step is formed on the pedal shaft 14 in an axial direction. Also, stress concentration can be reduced by making this step a curved surface in the axial direction. The stress concentration can be reduced by providing an R-shaped corner between the wall surface of the step and the outer peripheral surface of the pedal shaft 14 having a small diameter.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the bicycle pedal. Accordingly, these directional terms, as utilized to describe the bicycle pedal should be interpreted relative to a human-powered vehicle field (e.g., bicycle) in an upright riding position on a horizontal surface and that is equipped with the bicycle pedal. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
a pedal shaft having a first end portion that is configured to be attached to a bicycle crank, a second end portion that is on an opposite side of the first end portion in an axial direction with respect to a rotational center axis of the pedal shaft, and a contact portion located between the first end portion and the second end portion in the axial direction; and
a pedal body having a body part rotatably supported by a first bearing and a second bearing that are spaced apart on the pedal shaft with the second bearing disposed between the first bearing and the contact portion in the axial direction, and a load receiving part located at a position corresponding to the contact portion of the pedal shaft along the rotational center axis, the load receiving part being configured to receive a load from the contact portion of the pedal shaft,
the load receiving part being at least partly spaced from the contact portion under a no load condition and brought into contact with the contact portion upon the load applied to the pedal body.

2. The bicycle pedal according to claim 1, wherein
the load receiving part includes a load receiving contact portion that contacts the contact portion of the pedal shaft upon the load being applied to the pedal body, and
at least one of the load receiving contact portion of the load receiving part and the contact portion of the pedal shaft includes resin material.

3. The bicycle pedal according to claim 2, wherein
the load receiving part further includes a support portion that supports the load receiving contact portion, and
the support portion includes metallic material.

4. The bicycle pedal according to claim 1, wherein
the load receiving part is at least partly spaced from the contact portion by a distance under the no load condition, and
the distance ranges from 0.2 mm to 0.8 mm.

5. The bicycle pedal according to claim 1, wherein
the contact portion has a first outermost diameter that is larger than a second outermost diameter of the second end portion.

6. The bicycle pedal according to claim 1, wherein
the load receiving part includes a support portion that is attached to the body part.

7. The bicycle pedal according to claim 6, wherein
the support portion of the load receiving part is attached to the body part by at least one fastener.

8. The bicycle pedal according to claim 1, wherein
the body part includes a pedal shaft receiving bore configured to receive at least the second end portion of the pedal shaft.

9. The bicycle pedal according to claim 8, wherein
the load receiving part is spaced axially from an entrance opening of the pedal shaft receiving bore along the rotational center axis of the pedal shaft.

10. The bicycle pedal according to claim 1, wherein
the load receiving part absorbs at least a portion of a force applied to the pedal both a direction perpendicular to the rotational center axis of the pedal shaft.

11. The bicycle pedal according to claim 1, wherein
the load receiving part includes a pedal shaft receiving aperture that encircles the contact portion of the pedal shaft.

12. The bicycle pedal according to claim 1, wherein
the first bearing includes a sliding bearing disposed on the second end portion of the pedal shaft.

13. The bicycle pedal according to claim 1, wherein
the first bearing includes a first sliding bearing disposed on the second end portion of the pedal shaft, and the second bearing includes a second sliding bearing disposed between the first sliding bearing and the contact portion.

14. The bicycle pedal according to claim 1, wherein
the second bearing is disposed between the first bearing and the load receiving part in the axial direction.

15. A bicycle pedal comprising:
a pedal shaft having a first end portion that is configured to be attached to a bicycle crank, a second end portion that is on an opposite side of the first end portion in an axial direction with respect to a rotational center axis of the pedal shaft, and a contact portion located between the first end portion and the second end portion in the axial direction; and
a pedal body having a body part rotatably supported by the pedal shaft and a load receiving part located at a position corresponding to the contact portion of the pedal shaft along the rotational center axis, the load receiving part being configured to receive a load from the contact portion of the pedal shaft,
the load receiving part being at least partly spaced from the contact portion under a no load condition and brought into contact with the contact portion upon the load applied to the pedal body,
the load receiving part spaced axially from an entrance opening of the pedal shaft receiving bore along the rotational center axis of the pedal shaft,
the pedal shaft having an exposed portion that is disposed outside of the pedal body between the load receiving part and the entrance opening of the pedal shaft receiving bore.

16. A bicycle pedal comprising:
a pedal shaft having a rotational center axis; and
a pedal body rotatably supported by the pedal shaft around the rotational center axis, the pedal body including
a body part receiving the pedal shaft, and
at least one resin tread part attached to the body part by at least one threaded fastener that includes a threaded portion screwed into a fixing hole in the body part and a spike portion that protrudes outwardly with respect to the resin tread part,
the at least one threaded fastener further including a tool-engagement portion located between the spike portion and the threaded portion, the tool-engagement portion including a tool engagement surface on an outer circumference thereof, and the tool-engagement portion including a plurality of grooves which extend parallel to a fastener axis of the at least one threaded fastener.

17. The bicycle pedal according to claim 16, wherein
the tool-engagement portion includes a first tool-engagement portion and a second tool-engagement portion arranged in a fastener axial direction with respect to a fastener axis of the at least one threaded fastener, and the first tool-engagement portion and the second tool-engagement portion have a different profile with respect to each other.

18. The bicycle pedal according to claim 16, wherein
the at least one threaded fastener includes a head portion having an abutment surface that contacts an outer surface of the at least one resin tread part.

19. The bicycle pedal according to claim 16, wherein
the at least one threaded fastener includes a plurality of threaded fasteners.

20. The bicycle pedal according to claim 16, wherein
the body part includes a first side and a second side that is on an opposite side of the first side with respect to the body part, the at least one threaded fastener includes a plurality of threaded fasteners, and the at least one resin tread part includes a first resin tread part and a second resin tread part, the first resin tread part being attached to the first side of the body part by at least some of the plurality of threaded fasteners, and the second resin tread part being attached to the second side of the body part by at least some of the plurality of threaded fasteners.

21. A bicycle pedal comprising:
a pedal shaft having a rotational center axis; and
a pedal body rotatably supported by the pedal shaft around the rotational center axis, the pedal body including
a body part receiving the pedal shaft, and
at least one resin tread part attached to the body part by at least one threaded fastener that includes a threaded portion screwed into a fixing hole in the body part and a spike portion that protrudes outwardly with respect to the resin tread part, the threaded portion including a first threaded section and a second threaded section, the first threaded section having a larger diameter than the second threaded section, the first threaded section being provided at the at least one resin tread part and the second threaded section being screwed into the body part.

22. The bicycle pedal according to claim 21, wherein
the at least one resin tread part has a through-hole through which the threaded fastener passes, and at least one screw thread of the first threaded section contacts a side wall of the through-hole.

23. The bicycle pedal according to claim 21, wherein
the at least one threaded fastener includes an additional abutment surface between the first threaded section and the second threaded section in a fastener direction with respect to a fastener axis of the at least one threaded fastener, and the additional abutment surface contacts an outer suffice of the body part.

24. A bicycle pedal comprising:
a pedal shaft having a rotational center axis; and
a pedal body rotatably supported by the pedal shaft around the rotational center axis, the pedal body including
a body part receiving the pedal shaft, and
at least one resin tread part attached to the body part by at least one threaded fastener that includes a first threaded section and a second threaded section, the first threaded section having a larger diameter than the second threaded section, the first threaded section being provided at the resin tread part and the second threaded section being screwed into the body part.

25. The bicycle pedal according to claim 24, wherein
the at least one resin tread part has a through-hole through which the threaded fastener passes, and at least one screw thread of the first threaded section contacts a side wall of the through-hole.

26. The bicycle pedal according to claim 24, wherein
the at least one threaded fastener includes a head portion having an abutment surface that contacts an outer surface of the at least one resin tread part.

27. The bicycle pedal according to claim 24, wherein
the at least one threaded fastener includes an additional abutment surface between the first threaded section and the second threaded section in a fastener direction with respect to a fastener axis of the at least one threaded fastener, and the additional abutment surface contacts an outer surface of the body part.

28. The bicycle pedal according to claim 24, wherein
the at least one threaded fastener includes a plurality of threaded fasteners.

29. The bicycle pedal according to claim 24, wherein
the body part includes a first side and a second side that is on an opposite side of first side with respect to the body part, the at least one threaded fastener includes a plurality of threaded fasteners, and the at least one resin tread part includes a first resin tread part and a second resin tread part, the first resin tread part being attached to the first side of the body part by at least some of the plurality of threaded fasteners, and the second resin tread part being attached to the second side of the body part by at least some of the plurality of threaded fasteners.

30. A threaded fastener for a bicycle pedal comprising:
a first threaded section having a first diameter, the first threaded section configured to be provided in a hole formed in the bicycle pedal, and a second threaded section having a second diameter that is smaller than the first diameter, the second threaded section configured to screw into the bicycle pedal.

31. The threaded fastener according to claim 30, wherein
the first threaded section is configured to be provided at a tread part of the bicycle pedal, and the second threaded section is configured to be screwed into a body part of the bicycle pedal.

32. The threaded fastener according to claim 31, wherein
the threaded fastener includes a spike portion configured to protrude outwardly with respect to the tread part.

33. A spike pin for a bicycle pedal comprising:
a spike portion configured to protrude outwardly with respect to a tread part of the bicycle pedal;
a threaded portion configured to screw into the bicycle pedal; and
a tool-engagement portion located between the spike portion and the threaded portion, the tool-engagement portion including a tool engagement surface on an outer circumference thereof, and the tool-engagement portion including a plurality of grooves which extend parallel to a fastener axis of the spike pin.

34. The spike pin for the bicycle according to claim 33, wherein the tool-engagement portion includes a first tool-engagement portion and a second tool-engagement portion arranged in a spike pin axial direction with respect to a spike pin axis of the spike pin, and the first tool-engagement portion and the second tool-engagement portion have a different profile with respect to each other.

* * * * *